United States Patent
Nagaraja et al.

(10) Patent No.: US 11,687,666 B2
(45) Date of Patent: Jun. 27, 2023

(54) SYSTEM, METHOD, AND COMPUTER PROGRAM PRODUCT FOR CONDUCTING PRIVATE SET INTERSECTION (PSI) TECHNIQUES WITH MULTIPLE PARTIES USING A DATA REPOSITORY

(71) Applicant: Visa International Service Association, San Francisco, CA (US)

(72) Inventors: Vinjith Nagaraja, Austin, TX (US); Minghua Xu, Austin, TX (US); Karankumar Hiteshbhai Patel, Austin, TX (US)

(73) Assignee: Visa International Service Association, San Francisco, CA (US)

(*) Notice: Subject to any disclaimer, the term of this patent is extended or adjusted under 35 U.S.C. 154(b) by 338 days.

(21) Appl. No.: 17/146,562

(22) Filed: Jan. 12, 2021

(65) Prior Publication Data
US 2022/0222366 A1   Jul. 14, 2022

(51) Int. Cl.
| | |
|---|---|
| G06F 21/00 | (2013.01) |
| G06F 21/62 | (2013.01) |
| G06F 16/2455 | (2019.01) |
| G06N 20/00 | (2019.01) |
| G06F 16/28 | (2019.01) |
| G06F 16/23 | (2019.01) |
| G06F 21/60 | (2013.01) |

(52) U.S. Cl.
CPC ...... *G06F 21/6227* (2013.01); *G06F 16/2379* (2019.01); *G06F 16/24558* (2019.01); *G06F 16/285* (2019.01); *G06F 21/602* (2013.01); *G06N 20/00* (2019.01)

(58) Field of Classification Search
CPC ............ G06F 21/6227; G06F 16/2379; G06F 16/24558; G06F 16/285; G06F 21/602; G06F 21/6218; G06N 20/00; H04L 9/085; H04L 2209/46; H04L 2209/56
See application file for complete search history.

(56) References Cited

U.S. PATENT DOCUMENTS

| | | | |
|---|---|---|---|
| 9,443,092 B2 | 9/2016 | Nawaz et al. | |
| 10,311,442 B1* | 6/2019 | Lancaster | .............. G16H 10/00 |

(Continued)

FOREIGN PATENT DOCUMENTS

WO     2019116112 A1    6/2019

*Primary Examiner* — Mahfuzur Rahman
(74) *Attorney, Agent, or Firm* — The Webb Law Firm

(57) ABSTRACT

Provided are systems for conducting private set intersection (PSI) techniques with multiple parties using a data repository that include at least one processor to generate a data repository, receive, from a submission entity system associated with a submission entity, a private set intersection (PSI) data query that includes a match parameter for performing the PSI data query, transmit, to the submission entity system, a data classification encryption key, wherein the data classification encryption key is associated with a data field that corresponds to a match parameter data field of the match parameter, determine whether to authorize the PSI data query on the data repository, transmit, to the submission entity system, a data authorization encryption key based on determining to authorize the PSI data query on the data repository, and perform the PSI data query on the data repository. Methods and computer program products are also provided.

20 Claims, 12 Drawing Sheets

(56) References Cited

U.S. PATENT DOCUMENTS

| | | | |
|---|---|---|---|
| 10,991,242 B2* | 4/2021 | Taylor | H04Q 9/00 |
| 2012/0069131 A1* | 3/2012 | Abelow | G06Q 30/0601 |
| | | | 345/589 |
| 2019/0075088 A1 | 3/2019 | Chen et al. | |
| 2019/0318807 A1* | 10/2019 | O'Hara | G16B 50/10 |
| 2019/0386957 A1* | 12/2019 | Leon | H04L 63/18 |
| 2020/0195618 A1 | 6/2020 | Linton et al. | |
| 2020/0327252 A1* | 10/2020 | McFall | G06F 21/78 |
| 2022/0140996 A1* | 5/2022 | Cebere | H04L 9/008 |
| | | | 713/159 |

\* cited by examiner

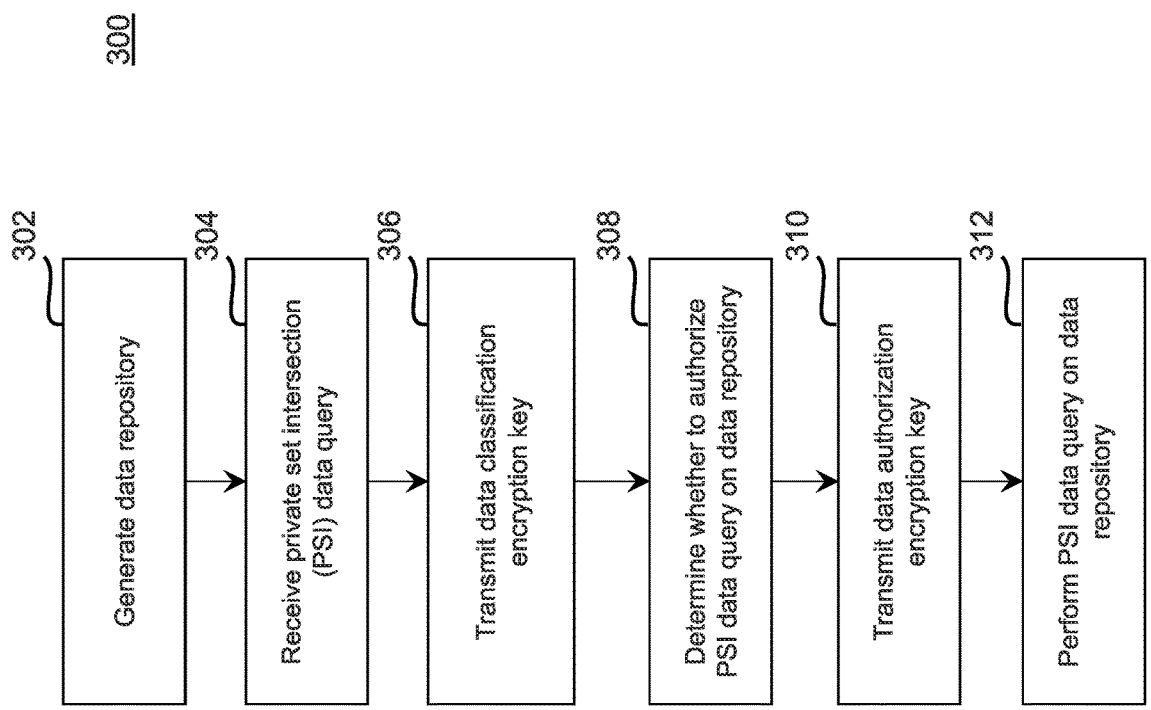

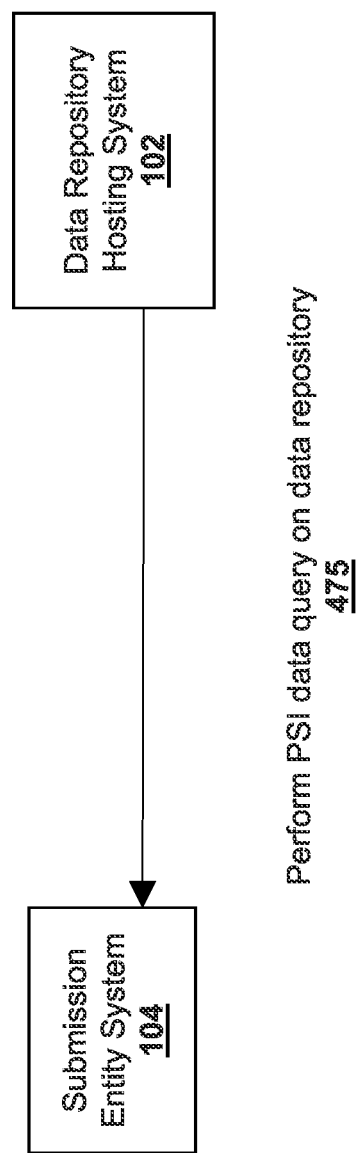

SYSTEM, METHOD, AND COMPUTER PROGRAM PRODUCT FOR CONDUCTING PRIVATE SET INTERSECTION (PSI) TECHNIQUES WITH MULTIPLE PARTIES USING A DATA REPOSITORY

BACKGROUND

1. Field

This disclosure relates generally to private set intersection (PSI) techniques and, in some non-limiting embodiments or aspects, to systems, methods, and computer program products for conducting PSI techniques with multiple parties using a data repository.

2. Technical Considerations

Private set intersection (PSI) may refer to a secure multi-party computation cryptographic technique that allows two parties (e.g., two data owners) that each hold a set of elements of information, to compare encrypted versions of these sets in order to compute an intersection (e.g., elements that are common between the two sets) between the sets. With PSI, neither of the two parties reveals anything to the other party except for the elements that are included in the intersection between the two sets.

In some instances, organizations (e.g., business entities, such as companies or financial institutions) may desire to share data to perform operations on the data, such as machine learning tasks, Structured Query Language (SQL) tasks, and/or the like. For example, groups within the Financial Services Information Sharing and Analysis Center (FS-ISAC), may require data to be shared across organizations in order to determine how to prevent fraud. However, regulations from government entities, such as, California Consumer Privacy Act (CCPA) in California or General Data Protection Regulation (GDPR) in the European Union, may make it difficult for organizations to share their data. To solve this problem, PSI techniques may be used, which may allow an organization to anonymize data that is being shared and only de-anonymize data that is common between two or more organizations.

However, PSI techniques may not account for a malicious entity who can provide data, such as account numbers (e.g., primary account numbers (PANs), bank account numbers, credit card account numbers, and/or the like) that do not belong to the malicious entity and were not authorized to be used by the malicious entity. In some instances, the malicious entity may obtain the account numbers by scrapping techniques used on Internet websites. In some instances, the malicious entity may attempt to conduct PSI techniques (e.g., PSI data queries) with random account numbers. In this way, the malicious entity may cause a data owner to unintentionally provide sensitive data, such as information associated with an account number, during a session with the malicious entity, where the data owner and the malicious entity are computing an intersection using a PSI technique.

SUMMARY

Accordingly, disclosed are systems, methods, and computer program products for conducting private set intersection (PSI) techniques with multiple parties using a data repository.

According to some non-limiting embodiments or aspects, provided is a method, comprising: generating, with at least one processor, a data repository; receiving, with the at least one processor, a private set intersection (PSI) data query, wherein the PSI data query comprises a match parameter for performing the PSI data query on the data repository; transmitting, with the at least one processor, a data classification encryption key, wherein the data classification encryption key is associated with a data field that corresponds to a match parameter data field of the match parameter; determining, with the at least one processor, whether to authorize the PSI data query on the data repository; transmitting, with the at least one processor, a data authorization encryption key based on determining to authorize the PSI data query on the data repository; and performing, with the at least one processor, the PSI data query on the data repository.

According to some non-limiting embodiments or aspects, provided is a system, comprising: a data repository hosting system comprising at least one processor programmed or configured to: generate a data repository; receive, from a submission entity system associated with a submission entity, a private set intersection (PSI) data query, wherein the PSI data query comprises a match parameter for performing the PSI data query on the data repository; transmit, to the submission entity system, a data classification encryption key, wherein the data classification encryption key is associated with a data field that corresponds to a match parameter data field of the match parameter; determine whether to authorize the PSI data query on the data repository; transmit, to the submission entity system, a data authorization encryption key based on determining to authorize the PSI data query on the data repository; and perform the PSI data query on the data repository.

According to some non-limiting embodiments or aspects, provided is a computer program product comprising at least one non-transitory computer-readable medium including one or more instructions that, when executed by at least one processor, cause the at least one processor to: generate a data repository; receive a private set intersection (PSI) data query, wherein the PSI data query comprises a match parameter for performing the PSI data query on the data repository; transmit a data classification encryption key, wherein the data classification encryption key is associated with a data field that corresponds to a match parameter data field of the match parameter; determine whether to authorize the PSI data query on the data repository; transmit a data authorization encryption key based on determining to authorize the PSI data query on the data repository; and perform the PSI data query on the data repository.

Further non-limiting embodiments or aspects are set forth in the following numbered clauses:

Clause 1: A method, comprising: generating, with at least one processor, a data repository; receiving, with the at least one processor, a private set intersection (PSI) data query, wherein the PSI data query comprises a match parameter for performing the PSI data query on the data repository; transmitting, with the at least one processor, a data classification encryption key, wherein the data classification encryption key is associated with a data field that corresponds to a match parameter data field of the match parameter; determining, with the at least one processor, whether to authorize the PSI data query on the data repository; transmitting, with the at least one processor, a data authorization encryption key based on determining to authorize the PSI data query on the data repository; and performing, with the at least one processor, the PSI data query on the data repository.

Clause 2: The method of clause 1, further comprising: generating a PSI result based on performing the PSI data query on the data repository; providing the PSI result as an input to a machine learning algorithm; and generating an output of the machine learning algorithm based on the input.

Clause 3: The method of clauses 1 or 2, wherein generating the data repository comprises: encrypting a first data field of a first transaction data record associated with a first entity with a first data classification encryption key to provide an encrypted first data field of the first transaction data record associated with the first entity, wherein the first data classification encryption key is assigned according to a classification of the first data field of the first transaction data record and the first entity; encrypting a second data field of the first transaction data record associated with the first entity with a second data classification encryption key to provide an encrypted second data field of the first transaction data record associated with the first entity, wherein the second data classification encryption key is assigned according to a classification of the second data field of the first transaction data record and the first entity; encrypting a first data field of a second transaction data record associated with a second entity with a third data classification encryption key to provide an encrypted first data field of the second transaction data record associated with the second entity, wherein the third data classification encryption key is assigned according to a classification of the first data field of the second transaction data record and the second entity; and encrypting a second data field of the second transaction data record associated with the second entity with a fourth data classification encryption key to provide an encrypted second data field of the second transaction data record associated with the second entity, wherein the fourth data classification encryption key is assigned according to a classification of the second data field of the second transaction data record and the second entity.

Clause 4: The method of any of clauses 1-3, wherein generating the data repository comprises: encrypting the encrypted first data field of the first transaction data record associated with the first entity with a first data authorization encryption key to provide a two-layer encrypted first data field of the first transaction data record associated with the first entity, wherein the first data authorization encryption key is assigned according to the first entity; encrypting the encrypted first data field of the second transaction data record associated with the second entity with a second data authorization encryption key to provide a two-layer encrypted first data field of the second transaction data record associated with the second entity, wherein the second data authorization encryption key is assigned according to the second entity; storing the two-layer encrypted first data field of the first transaction data record associated with the first entity in the data repository; and storing two-layer encrypted first data field of the second transaction data record associated with the second entity in the data repository.

Clause 5: The method of any of clauses 1-4, wherein generating the data repository comprises: storing the encrypted second data field of the first transaction data record associated with the first entity in the data repository; and storing the encrypted second data field of the second transaction data record associated with the second entity in the data repository.

Clause 6: The method of any of clauses 1-5, wherein the PSI data query further comprises an authorization parameter associated with the match parameter, wherein determining whether to authorize the PSI data query on the data repository comprises: transmitting a request for authorization based on the PSI data query; receiving a response for authorization, wherein the response for authorization comprises transaction data associated with the match parameter; determining that the transaction data associated with the match parameter included in the response for authorization corresponds to the authorization parameter associated with the match parameter; and determining to authorize the PSI data query based on determining that the transaction data associated with the match parameter corresponds to the authorization parameter associated with the match parameter.

Clause 7: The method of any of clauses 1-6, wherein receiving the PSI data query comprises: receiving the PSI data query from a submission entity; and wherein transmitting the data authorization encryption key comprises: transmitting the data authorization encryption key to the submission entity based on determining to authorize the PSI data query on the data repository.

Clause 8: A system, comprising: a data repository hosting system comprising at least one processor programmed or configured to: generate a data repository; receive, from a submission entity system associated with a submission entity, a private set intersection (PSI) data query, wherein the PSI data query comprises a match parameter for performing the PSI data query on the data repository; transmit, to the submission entity system, a data classification encryption key, wherein the data classification encryption key is associated with a data field that corresponds to a match parameter data field of the match parameter; determine whether to authorize the PSI data query on the data repository; transmit, to the submission entity system, a data authorization encryption key based on determining to authorize the PSI data query on the data repository; and perform the PSI data query on the data repository.

Clause 9: The system of clause 8, wherein the at least one processor is further programmed or configured to: generate a PSI result based on performing the PSI data query on the data repository; and transmit the PSI result to the submission entity system, wherein the submission entity system is programmed or configured to: provide the PSI result as an input to a machine learning algorithm; and generate an output of the machine learning algorithm based on the input.

Clause 10: The system of clauses 8 or 9, wherein, when generating the data repository, the at least one processor is programmed or configured to: encrypt a first data field of a first transaction data record associated with a first entity with a first data classification encryption key to provide an encrypted first data field of the first transaction data record associated with the first entity, wherein the first data classification encryption key is assigned according to a classification of the first data field of the first transaction data record and the first entity; encrypt a second data field of the first transaction data record associated with the first entity with a second data classification encryption key to provide an encrypted second data field of the first transaction data record associated with the first entity, wherein the second data classification encryption key is assigned according to a classification of the second data field of the first transaction data record and the first entity; encrypt a first data field of a second transaction data record associated with a second entity with a third data classification encryption key to provide an encrypted first data field of the second transaction data record associated with the second entity, wherein the third data classification encryption key is assigned according to a classification of the first data field of the second transaction data record and the second entity; and encrypt a second data field of the second transaction data record associated with the second entity with a fourth data classification encryption key to provide an encrypted second data field of the second transaction data record associated with the second entity, wherein the fourth data classification encryption key is assigned according to a classification of the second data field of the second transaction data record and the second entity.

Clause 11: The system of any of clauses 8-10, wherein, when generating the data repository, the at least one processor is programmed or configured to: encrypt the encrypted first data field of the first transaction data record associated with the first entity with a first data authorization encryption key to provide a two-layer encrypted first data field of the first transaction data record associated with the first entity, wherein the first data authorization encryption key is assigned according to the first entity; encrypt the encrypted first data field of the second transaction data record associated with the second entity with a second data authorization encryption key to provide a two-layer encrypted first data field of the second transaction data record associated with the second entity, wherein the second data authorization encryption key is assigned according to the second entity; store the two-layer encrypted first data field of the first transaction data record associated with the first entity in the data repository; and store two-layer encrypted first data field of the second transaction data record associated with the second entity in the data repository.

Clause 12: The system of any of clauses 8-11, wherein, when generating the data repository, the at least one processor is programmed or configured to: store the encrypted second data field of the first transaction data record associated with the first entity in the data repository; and store the encrypted second data field of the second transaction data record associated with the second entity in the data repository.

Clause 13: The system of any of clauses 8-12, wherein the PSI data query further comprises an authorization parameter associated with the match parameter, wherein, when determining whether to authorize the PSI data query on the data repository, the at least one processor is programmed or configured to: transmit a request for authorization based on the PSI data query; receive a response for authorization, wherein the response for authorization comprises transaction data associated with the match parameter; determine that the transaction data associated with the match parameter included in the response for authorization corresponds to the authorization parameter associated with the match parameter; and determine to authorize the PSI data query based on determining that the transaction data associated with the match parameter corresponds to the authorization parameter associated with the match parameter.

Clause 14: The system of any of clauses 8-13, wherein, when transmitting the data authorization encryption key, the at least one processor is programmed or configured to: transmit the data authorization encryption key to the submission entity system based on determining to authorize the PSI data query on the data repository.

Clause 15: A computer program product comprising at least one non-transitory computer-readable medium including one or more instructions that, when executed by at least one processor, cause the at least one processor to: generate a data repository; receive a private set intersection (PSI) data query, wherein the PSI data query comprises a match parameter for performing the PSI data query on the data repository; transmit a data classification encryption key, wherein the data classification encryption key is associated with a data field that corresponds to a match parameter data field of the match parameter; determine whether to authorize the PSI data query on the data repository; transmit a data authorization encryption key based on determining to authorize the PSI data query on the data repository; and perform the PSI data query on the data repository.

Clause 16: The computer program product of clause 15, wherein the one or more instructions, when executed by at least one processor, further cause the at least one processor to: generate a PSI result based on performing the PSI data query on the data repository; provide the PSI result as an input to a machine learning algorithm; and generate an output of the machine learning algorithm based on the input.

Clause 17: The computer program product of clauses 15 or 16, wherein, the one or more instructions that cause the at least one processor to generate the data repository, cause the at least one processor to: encrypt a first data field of a first transaction data record associated with a first entity with a first data classification encryption key to provide an encrypted first data field of the first transaction data record associated with the first entity, wherein the first data classification encryption key is assigned according to a classification of the first data field of the first transaction data record and the first entity; encrypt a second data field of the first transaction data record associated with the first entity with a second data classification encryption key to provide an encrypted second data field of the first transaction data record associated with the first entity, wherein the second data classification encryption key is assigned according to a classification of the second data field of the first transaction data record and the first entity; encrypt a first data field of a second transaction data record associated with a second entity with a third data classification encryption key to provide an encrypted first data field of the second transaction data record associated with the second entity, wherein the third data classification encryption key is assigned according to a classification of the first data field of the second transaction data record and the second entity; and encrypt a second data field of the second transaction data record associated with the second entity with a fourth data classification encryption key to provide an encrypted second data field of the second transaction data record associated with the second entity, wherein the fourth data classification encryption key is assigned according to a classification of the second data field of the second transaction data record and the second entity.

Clause 18: The computer program product of any of clauses 15-17, wherein, the one or more instructions that cause the at least one processor to generate the data repository, cause the at least one processor to: encrypt the encrypted first data field of the first transaction data record associated with the first entity with a first data authorization encryption key to provide a two-layer encrypted first data field of the first transaction data record associated with the first entity, wherein the first data authorization encryption key is assigned according to the first entity; encrypt the encrypted first data field of the second transaction data record associated with the second entity with a second data authorization encryption key to provide a two-layer encrypted first data field of the second transaction data record associated with the second entity, wherein the second data authorization encryption key is assigned according to the second entity; store the two-layer encrypted first data field of the first transaction data record associated with the first entity in the data repository; and store two-layer encrypted first data field of the second transaction data record associated with the second entity in the data repository.

Clause 19: The computer program product of any of clauses 15-18, wherein, the one or more instructions that cause the at least one processor to generate the data repository, cause the at least one processor to: store the encrypted second data field of the first transaction data record associated with the first entity in the data repository; and store the encrypted second data field of the second transaction data record associated with the second entity in the data repository.

Clause 20: The computer program product of any of clauses 15-19, wherein the PSI data query further comprises an authorization parameter associated with the match parameter, wherein, the one or more instructions that cause the at least one processor to determine whether to authorize the PSI data query on the data repository, cause the at least one processor to: transmit a request for authorization based on the PSI data query; receive a response for authorization, wherein the response for authorization comprises transaction data associated with the match parameter; determine that the transaction data associated with the match parameter included in the response for authorization corresponds to the authorization parameter associated with the match parameter; and determine to authorize the PSI data query based on determining that the transaction data associated with the match parameter corresponds to the authorization parameter associated with the match parameter.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

BRIEF DESCRIPTION OF THE DRAWINGS

FIG. 3 is a flowchart of a non-limiting embodiment or aspect of a process for conducting private set intersection (PSI) techniques with multiple parties using a data repository; and FIGS. 4A-4I are diagrams of non-limiting embodiments or aspects of an implementation of a process for conducting PSI techniques with multiple parties using a data repository.

DESCRIPTION

Figure 1:
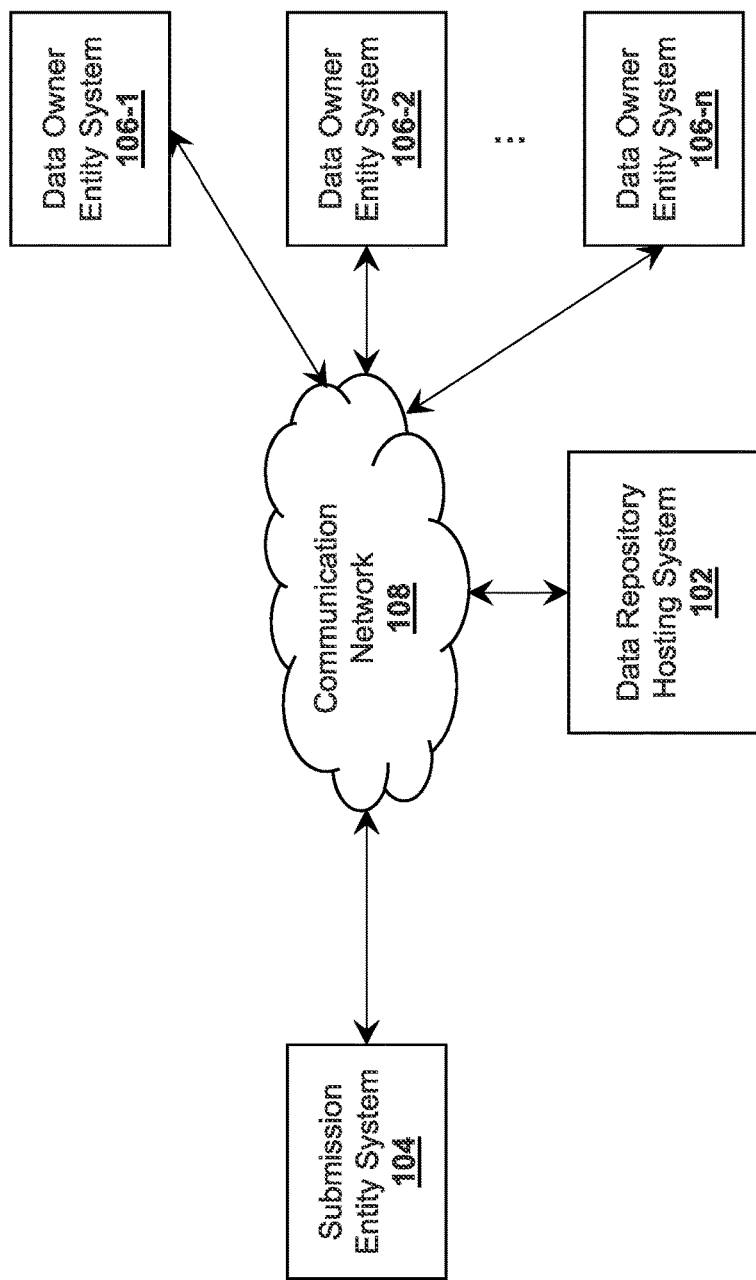
FIG. 1 is a diagram of a non-limiting embodiment or aspect of an environment in which systems, devices, products, apparatus, and/or methods, described herein, may be implemented according to the principles of the present disclosure.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects of the embodiments disclosed herein are not to be considered as limiting unless otherwise indicated.

No aspect, component, element, structure, act, step, function, instruction, and/or the like used herein should be construed as critical or essential unless explicitly described as such. In addition, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise. The phrase "based on" may also mean "in response to" where appropriate.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some non-limiting embodiments or aspects, a message may refer to a network packet (e.g., a data packet and/or the like) that includes data.

As used herein, the terms "issuer," "issuer institution," "issuer bank," or "payment device issuer," may refer to one or more entities that provide accounts to individuals (e.g., users, customers, and/or the like) for conducting payment transactions, such as credit payment transactions and/or debit payment transactions. For example, an issuer institution may provide an account identifier, such as a primary account number (PAN), to a customer that uniquely identifies one or more accounts associated with that customer. In some non-limiting embodiments or aspects, an issuer may be associated with a bank identification number (BIN) that uniquely identifies the issuer institution. As used herein, the term "issuer system" may refer to one or more computer systems operated by or on behalf of an issuer, such as a server executing one or more software applications. For example, an issuer system may include one or more authorization servers for authorizing a transaction.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network, such as Visa®, MasterCard®, American Express®, or any other entity that processes transactions. As used herein, the term "transaction service provider system" may refer to one or more computer systems operated by or on behalf of a transaction service provider, such as a transaction service provider system executing one or more software applications. A transaction service provider system may include one or more processors and, in some non-limiting embodiments or aspects, may be operated by or on behalf of a transaction service provider.

As used herein, the term "merchant" may refer to one or more entities (e.g., operators of retail businesses) that provide goods and/or services, and/or access to goods and/or services, to a user (e.g., a customer, a consumer, and/or the like) based on a transaction, such as a payment transaction. As used herein, the term "merchant system" may refer to one or more computer systems operated by or on behalf of a merchant, such as a server executing one or more software applications. As used herein, the term "product" may refer to one or more goods and/or services offered by a merchant.

As used herein, the term "acquirer" may refer to an entity licensed by the transaction service provider and approved by the transaction service provider to originate transactions (e.g., payment transactions) involving a payment device associated with the transaction service provider. As used herein, the term "acquirer system" may also refer to one or more computer systems, computer devices, and/or the like operated by or on behalf of an acquirer. The transactions the acquirer may originate may include payment transactions (e.g., purchases, original credit transactions (OCTs), account funding transactions (AFTs), and/or the like). In some non-limiting embodiments or aspects, the acquirer may be authorized by the transaction service provider to assign merchant or service providers to originate transactions involving a payment device associated with the transaction service provider. The acquirer may contract with payment facilitators to enable the payment facilitators to sponsor merchants. The acquirer may monitor compliance of the payment facilitators in accordance with regulations of the transaction service provider. The acquirer may conduct due diligence of the payment facilitators and ensure proper due diligence occurs before signing a sponsored merchant. The acquirer may be liable for all transaction service provider programs that the acquirer operates or sponsors. The acquirer may be responsible for the acts of the acquirer's payment facilitators, merchants that are sponsored by the acquirer's payment facilitators, and/or the like. In some non-limiting embodiments or aspects, an acquirer may be a financial institution, such as a bank.

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like operated by or on behalf of a payment gateway.

As used herein, the terms "client" and "client device" may refer to one or more computing devices, such as processors, storage devices, and/or similar computer components, that access a service made available by a server. In some non-limiting embodiments or aspects, a client device may include a computing device configured to communicate with one or more networks and/or facilitate transactions such as, but not limited to, one or more desktop computers, one or more portable computers (e.g., tablet computers), one or more mobile devices (e.g., cellular phones, smartphones, personal digital assistant, wearable devices, such as watches, glasses, lenses, and/or clothing, and/or the like), and/or other like devices. Moreover, the term "client" may also refer to an entity that owns, utilizes, and/or operates a client device for facilitating transactions with another entity.

As used herein, the term "server" may refer to one or more computing devices, such as processors, storage devices, and/or similar computer components that communicate with client devices and/or other computing devices over a network, such as the Internet or private networks and, in some examples, facilitate communication among other servers and/or client devices.

As used herein, the term "system" may refer to one or more computing devices or combinations of computing devices such as, but not limited to, processors, servers, client devices, software applications, and/or other like components. In addition, reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

Provided are improved systems, methods, and computer program products for conducting private set intersection (PSI) techniques with multiple parties using a data repository. Embodiments of the present disclosure may include a data repository hosting system that includes at least one processor programmed or configured to generate a data repository, receive, from a submission entity system associated with a submission entity, a PSI data query, wherein the PSI data query comprises a match parameter for performing a PSI data query on the data repository, transmit, to the submission entity system, a data classification encryption key, wherein the data classification encryption key is associated with a data field that corresponds to a match parameter data field of the match parameter, determine whether to authorize the PSI data query on the data repository, transmit, to the submission entity system, a data authorization encryption key based on determining to authorize the PSI data query on the data repository, and perform the PSI data query on the data repository.

In this way, embodiments of the present disclosure allow for a system to prevent an entity, such as a malicious entity, from accessing sensitive data without authorization, while using PSI techniques on a data repository. Based on the use of data classification encryption keys and data authorization encryption keys, the system may prevent a data owner from unintentionally providing sensitive data to an entity during a session that involves computing an intersection using a PSI technique.

Referring now to FIG. 1, FIG. 1 is a diagram of an example environment 100 in which devices, systems, methods, and/or products, described herein, may be implemented. As shown in FIG. 1, environment 100 includes data repository hosting system 102, submission entity system 104, at least one data owner entity system (e.g., data owner entity systems 106-1 through 106-$n$, referred to collectively as "data owner entity systems 106" and individually as "data owner entity system 106"), and/or communication network 108. Data repository hosting system 102, submission entity system 104, and/or data owner entity system(s) 106 may interconnect (e.g., establish a connection to communicate, and/or the like) via wired connections, wireless connections, or a combination of wired and wireless connections.

Data repository hosting system 102 may include one or more computing devices configured to communicate with submission entity system 104 and/or data owner entity system(s) 106 via communication network 108. For example, data repository hosting system 102 may include a server, a group of servers, and/or other like devices. In some non-limiting embodiments or aspects, data repository hosting system 102 may be associated with a transaction service provider system, as described herein. Additionally or alternatively, data repository hosting system 102 may be associated with a merchant system, a payment gateway, an acquirer system, issuer system, and/or a third party system, as described herein. In some non-limiting embodiments or aspects, data repository hosting system 102 may be in communication with at least one data storage device, which may be local or remote to data repository hosting system 102. In some non-limiting embodiments or aspects, data repository hosting system 102 may be capable of receiving information from, storing information in, communicating information to, or searching information stored in the data storage device(s).

Submission entity system 104 may include one or more computing devices configured to communicate with data repository hosting system 102 and/or data owner entity system(s) 106 via communication network 108. For example, submission entity system 104 may include a computing device, such as a server, a group of servers, a client device, a group of client devices, a desktop computer, a portable computer (e.g., tablet computer, a laptop computer, and/or the like), a mobile device (e.g., a cellular phone, a smartphone, a personal digital assistant, a wearable device, and/or the like), and/or other like devices. In some non-limiting embodiments or aspects, submission entity system 104 may be associated with a user (e.g., an individual operating a device). Additionally or alternatively, submission entity system 104 may be associated with a merchant system, as described herein. Additionally or alternatively, submission entity system 104 may be associated with a payment gateway, an acquirer system, an issuer system, a transaction service provider system, and/or a third party system, as described herein. In some non-limiting embodiments or aspects, submission entity system 104 may be the same as one of data owner entity systems 106 (e.g., a given data owner entity 106 may transmit a PSI data query, as described herein, and, therefore, may be considered submission entity system 104).

Data owner entity system 106 may include one or more computing devices configured to communicate with data repository hosting system 102, submission entity system 104, and/or other data owner entity systems 106 via communication network 108. For example, each data owner entity system 106 may include a computing device, such as a server, a group of servers, and/or other like devices. In some non-limiting embodiments or aspects, at least one of data owner entity systems 106 may be associated with an issuer system, as described herein. Additionally or alternatively, at least one of data owner entity systems 106 may be associated with a transaction service provider system, as described herein. Additionally or alternatively, at least one of data owner entity systems 106 may be associated with a merchant system, a payment gateway, an acquirer system, a user, and/or a third party system, as described herein.

Communication network 108 may include one or more wired and/or wireless networks. For example, communication network 108 may include a cellular network (e.g., a long-term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN) and/or the like), a private network, an ad hoc network, an intranet, the Internet, a fiber optic-based network, a cloud computing network, and/or the like, and/or a combination of some or all of these or other types of networks.

The number and arrangement of systems and/or devices shown in FIG. 1 are provided as an example. There may be additional systems and/or devices, fewer systems and/or devices, different systems and/or devices, or differently arranged systems and/or devices than those shown in FIG. 1. Furthermore, two or more systems and/or devices shown in FIG. 1 may be implemented within a single system or a single device, or a single system or a single device shown in FIG. 1 may be implemented as multiple, distributed systems or devices. Additionally or alternatively, a set of systems or a set of devices (e.g., one or more systems, one or more devices) of environment 100 may perform one or more functions described as being performed by another set of systems or another set of devices of environment 100.

Figure 2:
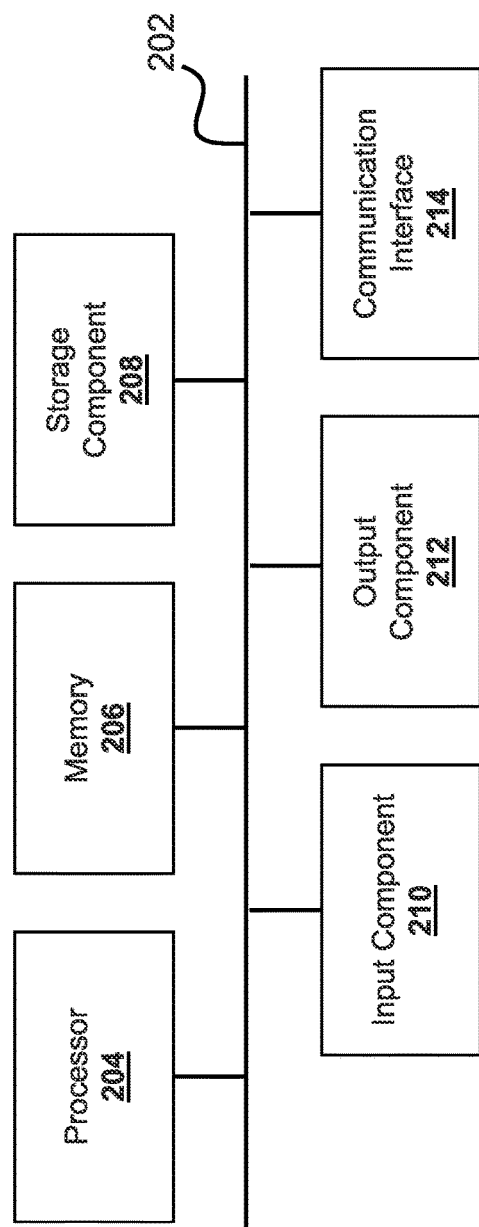
FIG. 2 is a diagram of a non-limiting embodiment or aspect of components of one or more devices and/or one or more systems of FIG. 1.

Referring now to FIG. 2, FIG. 2 is a diagram of example components of device 200. Device 200 may correspond to one or more devices of data repository hosting system 102, one or more devices of submission entity system 104, and one or more devices of data owner entity system 106. In some non-limiting embodiments or aspects, one or more devices of data repository hosting system 102, one or more devices of submission entity system 104, and/or one or more devices of data owner entity system 106 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments or aspects, processor 204 may be implemented in hardware, software, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read-only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touchscreen display, a keyboard, a keypad, a mouse, a button, a switch, a microphone, a camera, etc.). Additionally or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a Bluetooth® interface, a Zigbee® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

Memory 206 and/or storage component 208 may include data storage or one or more data structures (e.g., a database and/or the like). Device 200 may be capable of receiving information from, storing information in, communicating information to, or searching information stored in the data storage or one or more data structures in memory 206 and/or storage component 208. For example, the information may include input data, input data, output data, transaction data, account data, or any combination thereof.

The number and arrangement of components shown in FIG. 2 are provided as an example. In some non-limiting embodiments or aspects, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Referring now to FIG. 3, FIG. 3 is a flowchart of a non-limiting embodiment or aspect of a process 300 for conducting private set intersection (PSI) techniques with multiple parties using a data repository. In some non-limiting embodiments or aspects, one or more of the functions described with respect to process 300 may be performed (e.g., completely, partially, etc.) by data repository hosting system 102. In some non-limiting embodiments or aspects, one or more of the steps of process 300 may be performed (e.g., completely, partially, and/or the like) by another device or a group of devices separate from and/or including data repository hosting system 102, such as submission entity system 104, data owner entity system(s) 106, and/or the like.

As shown in FIG. 3, at step 302, process 300 may include generating a data repository. For example, data repository hosting system 102 may generate a data repository (e.g., a data lake, a database, and/or the like). In some non-limiting embodiments or aspects, data repository hosting system 102 may receive data (e.g., transaction data, transaction data records, and/or the like) from at least one data owner entity system 106 and data repository hosting system 102 may generate the data repository based on the data received from data owner entity system(s) 106.

In some non-limiting embodiments or aspects, the data repository may include data associated with (e.g., received from and/or the like) at least one data owner entity system 106 (e.g., a plurality of data owner entity systems 106). For example, data repository hosting system 102 may receive data from each data owner entity system 106 (e.g., each data owner entity system 106 that has opted into sharing data in the data repository). In some non-limiting embodiments or aspects, each data owner entity system 106 may have (e.g., store, have access to, and/or the like) data (e.g., transaction data) that includes at least one data record (e.g., transaction data record). Additionally or alternatively, each data record (e.g., transaction data record) may include at least one data field (e.g., a plurality of data fields). In some non-limiting embodiments or aspects, each data owner entity system 106 may opt (e.g., select and/or the like) to share at least some data fields (e.g., a subset of data fields) of at least some of the data records (e.g., a subset of data records) of the respective data owner entity system 106. Additionally or alternatively, each data owner entity system 106 may transmit the data that the respective data owner entity system 106 has elected to share (e.g., the subset of data fields of the subset of the data records and/or the like) and/or an encrypted version thereof (e.g., encrypted data fields and/or the like, as described herein) to data repository hosting system 102.

In some non-limiting embodiments or aspects, data in the data repository from each respective data owner entity system 106 may be encrypted with at least one encryption key associated with the respective data owner entity system 106 (e.g., a data classification encryption key, a data authorization key, and/or the like, as described herein). For example, each data owner entity system 106 may generate a data classification encryption key for each data field that will be shared. Additionally or alternatively, each data owner entity system 106 may encrypt the data thereof (e.g., each data field of the subset of data fields of the subset of the data records and/or the like) with the respective data classification encryption key to provide encrypted data (e.g., encrypted data fields), e.g., before communicating the encrypted data (e.g., encrypted data fields) to data repository hosting system 102. In some non-limiting embodiments or aspects, data repository hosting system 102 may generate at least one data classification encryption key. Additionally or alternatively, data repository hosting system 102 may encrypt at least one data field (e.g., a data field of a data record received from data owner entity system 106, a data field of a data record stored by data repository hosting system 102, and/or the like) with a respective data classification encryption key (e.g., as generated by data repository hosting system 102).

For the purpose of illustration and not limitation, first data owner entity system 106-1 may encrypt a first data field of a first transaction data record with a first data classification encryption key to provide an encrypted first data field of the first transaction data record, and the first data classification encryption key may be generated (e.g., created, assigned, and/or the like) by first data owner entity system 106-1 according to a classification of the first data field of the first transaction data record and the first data owner entity. First data owner entity system 106-1 may encrypt a second data field of the first transaction data record with a second data classification encryption key to provide an encrypted second data field of the first transaction data record, and the second data classification encryption key may be generated (e.g., created, assigned, and/or the like) first data owner entity system 106-1 according to a classification of the second data field of the first transaction data record and the first data owner entity. Additionally or alternatively, second data owner entity system 106-2 may encrypt a first data field of a second transaction data record with a third data classification encryption key to provide an encrypted first data field of the second transaction data record, and the third data classification encryption key may be generated (e.g., created, assigned, and/or the like) by second data owner entity system 106-2 according to a classification of the first data field of the second transaction data record and the second data owner entity. Second data owner entity system 106-2 may encrypt a second data field of the second transaction data record associated with a fourth data classification encryption key to provide an encrypted second data field of the second transaction data record, and the fourth data classification encryption key may be generated (e.g., created, assigned, and/or the like) by second data owner entity system 106-2 according to a classification of the second data field of the second transaction data record and the second data owner entity. Additionally or alternatively, data repository hosting system 102 may encrypt a first data field of a third transaction data record with a fifth data classification encryption key to provide an encrypted first data field of the third transaction data record, and the fifth data classification encryption key may be generated (e.g., created, assigned, and/or the like) by data repository hosting system 102 according to a classification of the first data field of the third transaction data record and the data repository host. The first data field of the third transaction data record may correspond to the first data field of the first transaction record. Data repository hosting system 102 may encrypt a second data field of the third transaction data record with a sixth data classification encryption key to provide an encrypted second data field of the third transaction data record, and the sixth data classification encryption key may be generated (e.g., created, assigned, and/or the like) by data repository hosting system 102 according to a classification of the second data field of the third transaction data record and the data repository host. Additionally or alternatively, data repository hosting system 102 may encrypt a first data field of a fourth transaction data record with the fifth data classification encryption key to provide an encrypted first data field of the fourth transaction data record. The first data field of the fourth transaction data record may correspond to the first data field of the second transaction record. Data repository hosting system 102 may encrypt a second data field of the fourth transaction data record with the sixth data classification encryption key to provide an encrypted second data field of the fourth transaction data record.

In some non-limiting embodiments or aspects, data repository hosting system 102 may generate a data authorization encryption key for each data owner entity system 106. Additionally or alternatively, data repository hosting system 102 may encrypt at least one data field associated with each respective data owner entity system 106 with the respective data authorization encryption key thereof. Additionally or alternatively, data repository hosting system 102 may transmit the respective data authorization encryption key to each respective data owner entity system 106.

For the purpose of illustration and not limitation, data repository hosting system 102 may encrypt the encrypted the first data field of the third transaction data record (e.g., corresponding to the first data field of the first transaction data record associated with first data owner entity system 106-1) with a first data authorization encryption key (e.g., generated by data repository hosting system 102 for first data owner entity system 106-1) to provide a two-layer encrypted first data field of the third transaction data record. Additionally or alternatively, data repository hosting system 102 may encrypt the encrypted first data field of the fourth transaction data record (e.g., corresponding to the first data field of the second transaction data record associated with second data owner entity system 106-2) with a second data authorization encryption key (e.g., generated by data repository hosting system 102 for second data owner entity system 106-2) to provide a two-layer encrypted first data field of the fourth transaction data record.

In some non-limiting embodiments or aspects, data repository hosting system 102 may store the encrypted data (e.g., at least some of the encrypted data fields, the two-layer encrypted data fields, and/or the like, as described herein) to provide the data repository. Additionally or alternatively, data repository hosting system 102 may transmit the respective data classification encryption key for each two-layer encrypted data field to the respective data owner entity system 106 associated therewith.

For the purpose of illustration and not limitation, data repository hosting system 102 may store the two-layer encrypted first data field of the third transaction data record, the two-layer encrypted first data field of the fourth transaction data record, the encrypted first data field of the first transaction data record, the encrypted second data field of the first transaction data record, the encrypted first data field of the second transaction data record, the encrypted second data field of the second transaction data record, the encrypted second data field of the third transaction data record, the encrypted second data field of the fourth transaction data record, and/or the like. For example, data repository hosting system 102 may store the two-layer encrypted first data field of the third transaction data record in association (e.g., in a single data record, in a single row of a database, and/or the like) with the encrypted second data field of the first transaction data record and/or the encrypted second data field of the third transaction data record. Additionally or alternatively, data repository hosting system 102 may store the two-layer encrypted first data field of the fourth transaction data record in associated with the encrypted second data field of the second transaction data record and/or the encrypted second data field of the fourth transaction data record. Additionally or alternatively, data repository hosting system 102 may transmit the fifth data classification encryption key to first data owner entity system 106-1 and/or second data owner entity system 106-2.

In some non-limiting embodiments or aspects, each data owner entity system 106 may generate a data authorization encryption key (e.g., in addition to the data authorization key(s) generated by data repository hosting system 102, in lieu of the data authorization key(s) generated by data repository hosting system 102, and/or the like). Additionally or alternatively, each data owner entity system 106 may encrypt at least one data field with the respective data authorization encryption key thereof.

For the purpose of illustration and not limitation, first data owner entity system 106-1 may encrypt the encrypted the first data field of the first transaction data record (e.g., corresponding to the first data field of the third transaction data record) with a third data authorization encryption key (e.g., generated by first data owner entity system 106-1) to provide a two-layer encrypted first data field of the first transaction data record. Additionally or alternatively, second data owner entity system 106-2 may encrypt the encrypted first data field of the second transaction data record (e.g., corresponding to the first data field of the fourth transaction data record) with a fourth data authorization encryption key (e.g., generated by second data owner entity system 106-2) to provide a two-layer encrypted first data field of the second transaction data record.

In some non-limiting embodiments or aspects, data repository hosting system 102 may store the two-layer encrypted data (e.g., the two-layer encrypted data fields and/or the like, as described herein) from each data owner entity system 106 in the data repository. For example, each data owner entity system 106 may transmit the respective two-layer encrypted data thereof to data repository hosting system 102. Additionally or alternatively, data repository hosting system 102 may store such two-layer encrypted data in the data repository (e.g., in addition to the encrypted data stored therein, in place of at least a portion of the encrypted data stored therein, and/or the like).

For the purpose of illustration and not limitation, first data owner entity system 106-1 may transmit the two-layer encrypted first data field of the first transaction data record to data repository hosting system 102, and/or data repository hosting system 102 may replace the two-layer encrypted first data field of the third transaction data record with the two-layer encrypted first data field of the first transaction data record. Additionally or alternatively, second data owner entity system 106-2 may transmit the two-layer encrypted first data field of the second transaction data record to data repository hosting system 102, and/or data repository hosting system 102 may replace the two-layer encrypted first data field of the fourth transaction data record with the two-layer encrypted first data field of the second transaction data record.

As shown in FIG. 3, at step 304, process 300 may include receiving a PSI data query. For example, data repository hosting system 102 may receive a PSI data query from submission entity system 104. In some non-limiting embodiments, the PSI data query may include a match parameter for performing a PSI data query on the data repository. Additionally or alternatively, the PSI data query may include an authorization parameter associated with the match parameter. Additionally or alternatively, the PSI data query may include a desired output based on at least one of the match parameter, the authorization parameter, any combination thereof, and/or the like.

In some non-limiting embodiments or aspects, the desired output may be associated with an output of a machine learning algorithm. For example, the machine learning algorithm may be configured (e.g., trained, programmed, and/or the like) to generate the output (e.g., the desired output) based on at least one input. In some non-limiting embodiments or aspects, submission entity system 104 may transmit the machine learning algorithm and/or a listing of at least one input of the machine learning algorithm to data repository hosting system 102. Additionally or alternatively, data repository hosting system 102 may determine at least one field (e.g., encrypted field) of the data repository associated with the at least one input of the machine learning algorithm.

For the purpose of illustration and not limitation, submission entity system 104 may be associated with a merchant system. Additionally or alternatively, submission entity system 104 may store an account identifier associated with a user (and/or other data associated therewith such as expiration date, security code (e.g., card security code (CSC), card verification data (CVD), card verification number, card verification value (CVV), card verification value code, card verification code (CVC), verification code (V-code or V code), signature panel code (SPC), and/or the like), transaction data, any combination thereof, and/or the like). Submission entity system 104 may transmit a PSI data query having the account identifier (and/or a tokenized version thereof) as the match parameter (and/or other data such as expiration date, security code, transaction data, and/or the like as the authorization parameter) to data repository hosting system 102. Additionally or alternatively, submission entity system 104 may transmit a machine learning algorithm associated with a desired output (e.g., the probability that a user will purchase a given product) to data repository hosting system 102. Additionally or alternatively, data repository hosting system 102 may determine at least one input of the machine learning algorithm (e.g., based on the machine learning algorithm). Data repository hosting system 102 may determine at least one field of the data repository based on the input(s) of the machine learning algorithm. For example, data repository may determine fields associated with account identifier, purchase history, location (e.g., zip code), any combination thereof, and/or the like based on the inputs to the machine learning algorithm.

As shown in FIG. 3, at step 306, process 300 may include transmitting a data classification encryption key. For example, data repository hosting system 102 may transmit a data classification encryption key to submission entity system 104. In some non-limiting embodiments or aspects, the data classification encryption key may be associated with a data field that corresponds to a data field of the match parameter.

For the purpose of illustration and not limitation, data repository hosting system 102 may transmit a data classification encryption key (e.g., first data classification encryption key, third data classification encryption key, fifth data classification encryption key, and/or the like) to submission entity system 104. For example, the (two-layer encrypted) first field of the first transaction data record, the (two-layer encrypted) first field of the second transaction data record, the (two-layer encrypted) first field of the third transaction data record, or the (two-layer encrypted) first field of the fourth transaction data record may correspond to the match parameter (e.g., the account identifier). For example, data repository hosting system 102 may determine that the (two-layer encrypted) first field of the first transaction data record corresponds to the match parameter (e.g., the account identifier). Additionally or alternatively, data repository hosting system 102 may transmit the first data classification encryption key to submission entity system 104.

As shown in FIG. 3, at step 308, process 300 may include determining whether to authorize the PSI data query on the data repository. For example, data repository hosting system 102 and/or one of the data owner entity system(s) 106 may determine whether to authorize the PSI data query on the data repository. In some non-limiting embodiments or aspects, data repository hosting system 102 and/or data owner entity system 106 may determine whether to authorize the PSI data query on the data repository based on a rule of data owner entity system 106. For example, data repository hosting system 102 and/or data owner entity system 106 may compare the PSI data query to the rule of data owner entity system 106. If the PSI data query satisfies the rule, data repository hosting system 102 and/or data owner entity system 106 may determine to authorize the PSI data query. If the PSI data query does not satisfy the rule, data repository hosting system 102 and/or data owner entity system 106 may determine not to authorize the PSI data query.

In some non-limiting embodiments or aspects, the PSI data query may include a match parameter and/or an authorization parameter, as described herein. Additionally or alternatively, data repository hosting system 102 and/or submission entity system 104 may transmit a request for authorization based on the PSI data query to data owner entity system(s) 106. Additionally or alternatively, data repository hosting system 102 and/or submission entity system 104 may receive a response for authorization.

In some non-limiting embodiments, the response for authorization may include transaction data associated with the match parameter. For example, such a response for authorization may be received by data repository hosting system 102. Additionally or alternatively, data repository hosting system 102 may determine that the transaction data associated with the match parameter included in the response for authorization corresponds to the authorization parameter associated with the match parameter. Data repository hosting system 102 may determine to authorize the PSI data query based on (e.g., in response to) determining that the transaction data associated with the match parameter corresponds to the authorization parameter associated with the match parameter.

In some non-limiting embodiments or aspects, submission entity system 104 may transmit the request for authorization to data owner entity system(s) 106. Additionally or alternatively, each data owner entity system 106 that receives the request for authorization may determine whether transaction data (e.g., stored by the respective data owner entity system 106) associated with the match parameter corresponds to the authorization parameter associated with the match parameter. Additionally or alternatively, at least one data owner entity system 106 may determine to authorize the PSI data query based on (e.g., in response to) determining that the transaction data associated with the match parameter corresponds to the authorization parameter associated with the match parameter. Such data owner entity system 106 may transmit the response for authorization to submission entity system 104. In some non-limiting embodiments or aspects, the response for authorization may include a data authorization key, as described below.

As shown in FIG. 3, at step 310, process 300 may include transmitting a data authorization key. For example, data repository hosting system 102 and/or one of data owner entity system(s) 106 may transmit a data authorization encryption key to submission entity system 104 based on determining to authorize the PSI data query on the data repository.

In some non-limiting embodiments or aspects, data repository hosting system 102 and/or data owner entity system 106 may transmit a data authorization encryption key to submission entity system 104 based on determining to authorize the PSI data query on the data repository. For example, data repository hosting system 102 may transmit a data authorization encryption key that was generated by data repository hosting system 102 to submission entity system 104. Additionally or alternatively, data repository hosting system 102 may receive (e.g., from one of data owner entity system(s) 106) a data authorization encryption key (e.g., as generated by the respective data owner entity system 106), and/or data repository hosting system 102 may transmit such a data authorization encryption key to submission entity system 104.

In some non-limiting embodiments or aspects, data repository hosting system 102 and/or one of data owner entity system(s) 106 may transmit a data authorization encryption key (e.g., as generated by the respective data owner entity system 106) to submission entity system 104. For example, the respective data owner entity system 106 may transmit the data authorization encryption key based on (e.g., in response to) determining to authorize the PSI data query. In some non-limiting embodiments or aspects, data repository hosting system 102 and/or one of data owner entity system(s) 106 may transmit a data classification encryption key to submission entity system 104. For example, data repository hosting system 102 and/or one of data owner entity system(s) 106 may transmit a data classification encryption key to submission entity system 104 based on determining to authorize the PSI data query.

For the purpose of illustration and not limitation, first data owner entity system 106-1 may transmit the third data authorization encryption key (e.g., generated by first data owner entity system 106-1 to provide the two-layer encrypted first data field of the first transaction data record) to submission entity system 104 based on determining to authorize the PSI data query from submission entity system 104. Additionally or alternatively, data repository hosting system 102 may transmit the first data authorization encryption key (e.g., generated by data repository hosting system 102 to provide the two-layer encrypted first data field of the third transaction data record) to submission entity system 104 based on determining to authorize the PSI data query from submission entity system 104.

As shown in FIG. 3, at step 312, process 300 may include performing the PSI data query on the data repository. For example, data repository hosting system 102 may perform the PSI data query on the data repository (e.g., carry out a PSI protocol on the data repository). In some non-limiting embodiments or aspects, data repository hosting system 102 may perform the PSI data query by computing an intersection between the PSI data query submitted (e.g., transmitted) by and received from submission entity system 104 and the data repository using a PSI technique. In some non-limiting embodiments or aspects, the PSI technique may include the use of an oblivious pseudorandom function (OPRF), such as a one-time OPRF.

In some non-limiting embodiments or aspects, data repository hosting system 102 may generate a PSI result based on performing the PSI data query on the data repository. For example, data repository hosting system 102 may generate the PSI result based on computing the intersection between the PSI data query submitted by and received from submission entity system 104 and the data repository using the PSI technique. In some non-limiting embodiments or aspects, the PSI result may include a transaction data record that include one or more two-layer encrypted data fields.

In some non-limiting embodiments or aspects, data repository hosting system 102 may transmit the PSI result to submission entity system 104. For example, data repository hosting system 102 may transmit the encrypted data (e.g., encrypted data fields) corresponding to the PSI result to submission entity system 104. Additionally or alternatively, data repository hosting system 102 may transmit the data classification encryption keys associated with the encrypted data (e.g., encrypted data fields) corresponding to the PSI result to submission entity system 104.

In some non-limiting embodiments or aspects, data repository hosting system 102 may perform a machine learning computation based on the PSI result. In some non-limiting embodiments, data repository hosting system 102 may provide the PSI result as an input to a machine learning algorithm. Additionally or alternatively, data repository hosting system 102 may generate an output of the machine learning algorithm based on the input. In some non-limiting embodiments or aspects, data repository hosting system 102 may transmit the output of the machine learning algorithm to submission entity system 104. In some non-limiting embodiments or aspects, submission entity system 104 may generate the output of the machine learning algorithm based on the input (e.g., the PSI result).

In some non-limiting embodiments or aspects, submission entity system 104 may receive the PSI result, and submission entity system 104 may perform a machine learning computation based on the PSI result. In some non-limiting embodiments or aspects, submission entity system 104 may use a data authorization encryption key and/or a data classification encryption key to decrypt the PSI result. In one example, submission entity system 104 may receive the PSI result, and submission entity system 104 may use the data authorization encryption key associated with data owner entity system 106 (e.g., the data authorization encryption key provided by data owner entity system 106 to submission entity system 104, the data authorization encryption key provided by data owner entity system 106 to data repository hosting system 102, and/or the like), which was used to encrypt the data that is included in the PSI result. In such an example, submission entity system 104 may use the data authorization encryption key to decrypt one or more two-layer encrypted data fields of a transaction data record included in the PSI result. Additionally, submission entity system 104 may use the data classification encryption key associated with the classification of one or more encrypted data fields (e.g., the data classification encryption key that was used to encrypt one or more data fields of the transaction record based on a classification of the one more data fields) of the transaction data record included in the PSI result.

In some non-limiting embodiments or aspects, if submission entity system 104 does not have an appropriate encryption key (e.g., a data authorization encryption key and/or a data classification encryption key) to decrypt an encrypted data field of the PSI result, submission entity system 104 may not be able to perform the machine learning computation based on the PSI result. For example, if submission entity system 104 does not receive the appropriate encryption key from data repository hosting system 102 and/or data owner system 106, submission entity system 104 may not be able to decrypt one or more encrypted data fields of the PSI result and submission entity system 104 may not be able to perform the machine learning computation based on one or more encrypted data fields of the PSI result that could not be decrypted. In some non-limiting embodiments or aspects, submission entity system 104 may not be able to perform the machine learning computation based on any encrypted data fields in the PSI result that were not able to be decrypted. Additionally or alternatively, submission entity system 104 may be able to perform the machine learning computation based on any encrypted data fields in the PSI result that were able to be decrypted.

In some non-limiting embodiments or aspects, data repository hosting system 102 may create an audit record based on performing a PSI data query on the data repository. For example, data repository hosting system 102 may create the audit record that includes data associated with the PSI data query from submission entity system 104 that was performed on the data repository. In some non-limiting embodiments or aspects, the audit record may include data that indicates an identity of submission entity system 104 and/or data that indicates one or more data authorization encryption keys and/or one or more data classification encryption keys that are used to decrypt the PSI result of the PSI data query. In some non-limiting embodiments or aspects, the audit record may include data that indicates a situation where the PSI data query included a request for data of a transaction record which was not authorized. For example, the audit record may include a data field that indicates that the PSI data query from submission entity system 104 included a request for data of a transaction record for which submission entity system 104 was not authorized to access. In some non-limiting embodiments or aspects, the audit record may include a data field indicating that submission entity system 104 is a malicious entity based on the PSI data query from submission entity system 104 including a request for data of a transaction record for which submission entity system 104 was not authorized to access. In some non-limiting embodiments or aspects, data repository hosting system 102 may store the audit record in the data repository.

Referring now to FIGS. 4A-4I, FIGS. 4A-4I are diagrams of an implementation 400 of a process (e.g., process 300) for conducting PSI techniques with multiple parties using a data repository. As shown in FIGS. 4A-4I, implementation 400 may include data repository hosting system 102, data owner entity system 106-1, data owner entity system 106-2, data owner entity system 106-3, and submission entity system 104. However, some non-limiting embodiments or aspects may include data repository hosting system 102, data owner entity system 106-2, data owner entity system 106-3, and submission entity system 104, and are independent of data owner entity system 106-1 and the operations specified by data owner entity system 106-1 in implementation 400. For example, in some non-limiting embodiments or aspects, implementation 400 may include data repository hosting system 102 generating a data repository using a second transaction data record from data owner entity system 106-2 and a third transaction data record from data owner entity system 106-3, without using a first transaction data record from data owner entity system 106-1. In such an example, data owner entity system 106-2 may be referred to as a "first entity" and data owner entity system 106-3 may be referred to as a "second entity." Additionally, while account numbers are referred to as primary account numbers (PANs) in implementation 400, any PAN may be a token for the PAN (e.g., a tokenized PAN).

As shown in FIGS. 4A through 4F, data repository hosting system 102 may generate a data repository. As shown by reference number 405 in FIG. 4A, data repository hosting system 102 may receive a first transaction data record associated with data owner entity system 106-1, a second transaction data record associated with data owner entity system 106-2, and a third transaction data record associated with data owner entity system 106-3 from data owner entity system 106-1, data owner entity system 106-2, and data owner entity system 106-3, respectively.

Figure 4A:
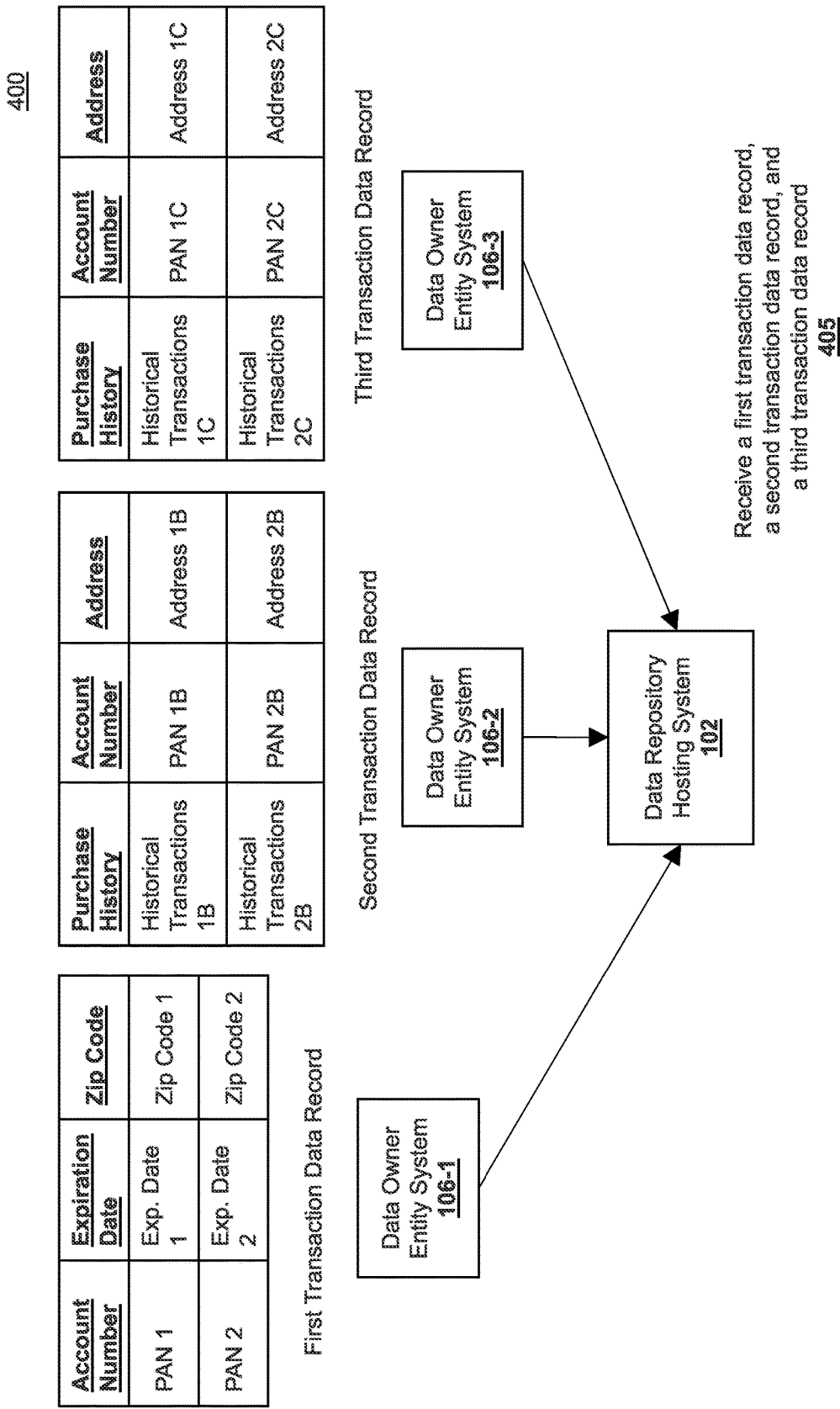
Figure 4B:
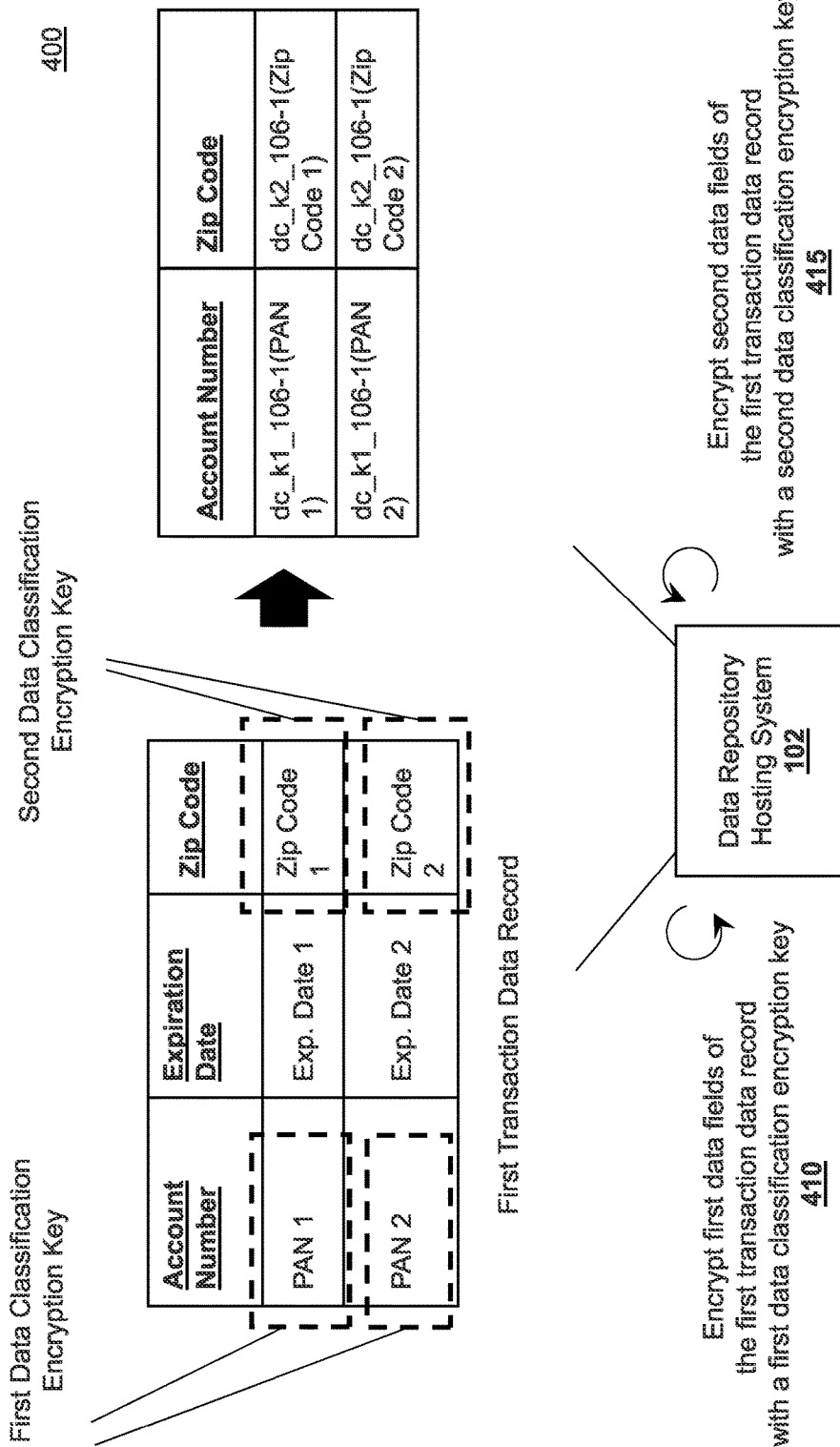

As shown by reference number 410 in FIG. 4B, data repository hosting system 102 may encrypt first data fields of the first transaction data record with a first data classification encryption key. For example, data repository hosting system 102 may encrypt the first data fields of the first transaction data record, which have a first classification (e.g., class, category, and/or the like) shown as "Account Number", with the first data classification encryption key that corresponds to the first classification (e.g., the account number encryption key) to provide encrypted first data fields of the first transaction data record. In some non-limiting embodiments or aspects, data owner entity system 106-1 may encrypt the first data fields of the first transaction data record with the first data classification encryption key before transmitting the first transaction data record to data repository hosting system 102. As further shown by reference number 415 in FIG. 4B, data repository hosting system 102 may encrypt second data fields of the first transaction data record with a second data classification encryption key. For example, data repository hosting system 102 may encrypt the second data fields of the first transaction data record, which have a second classification, shown as "Zip Code", with the second data classification encryption key that corresponds to the second classification (e.g., the zip code encryption key) to provide encrypted second data fields of the first transaction data record. In some non-limiting embodiments or aspects, data owner entity system 106-1 may encrypt the first data fields and/or the second data fields of the first transaction data record with the first data classification encryption key and/or the second data classification encryption key, respectively, before transmitting the first transaction data record to data repository hosting system 102.

Figure 4C:
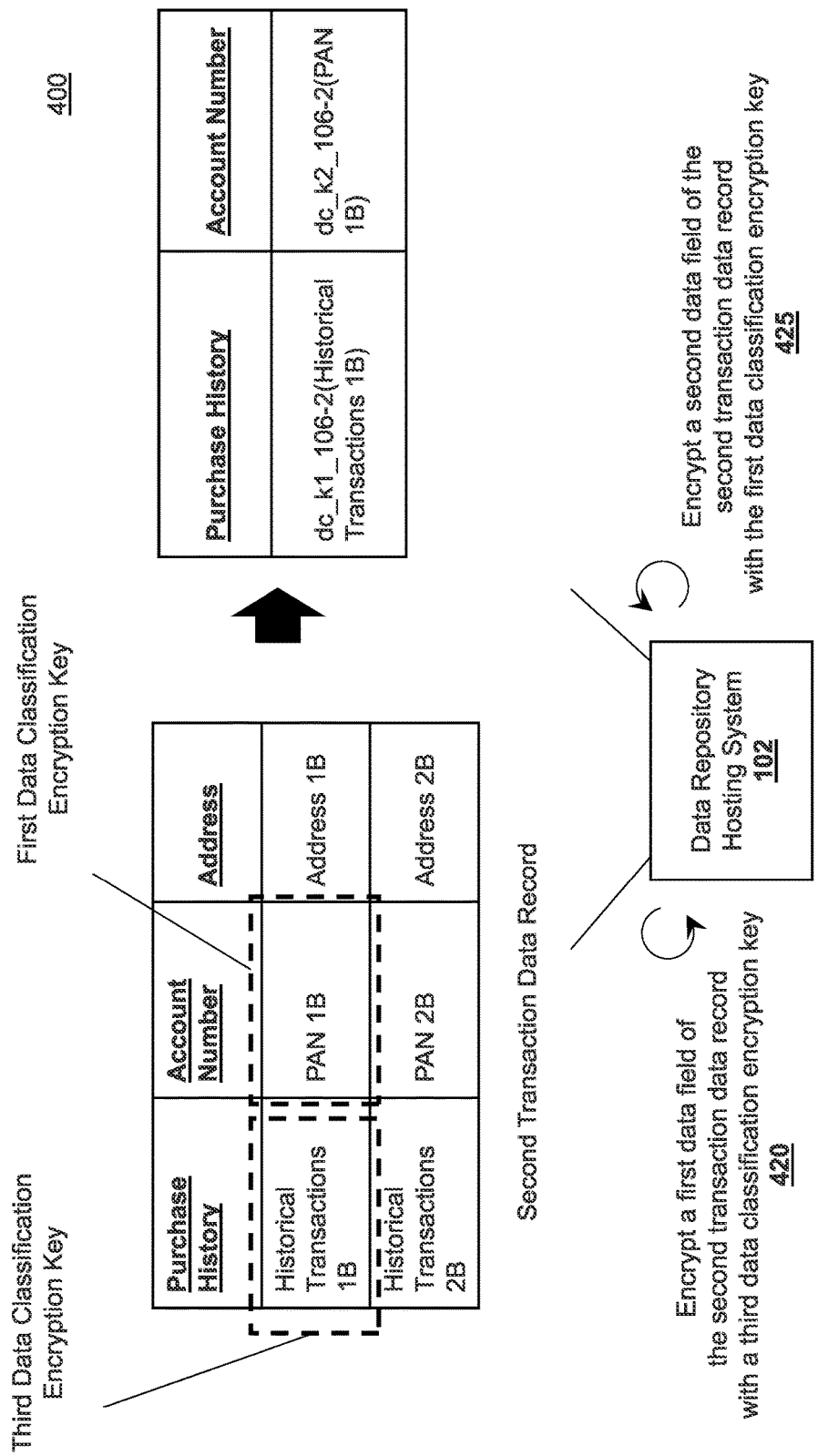

As shown by reference number 420 in FIG. 4C, data repository hosting system 102 may encrypt a first data field of the second transaction data record with a third data classification encryption key. For example, data repository hosting system 102 may encrypt the first data field of the second transaction data record, which has a third classification, shown as "Purchase History", with the third data classification encryption key that corresponds to a third classification (e.g., the purchase history encryption key) to provide an encrypted first data field of the second transaction data record. In some non-limiting embodiments or aspects, the first data classification encryption key, the second data classification encryption key, and/or the third data classification encryption key may be assigned to data owner entity system 106-1. As further shown by reference number 425 in FIG. 4C, data repository hosting system 102 may encrypt a second data field of the second transaction data record with the first data classification encryption key. For example, data repository hosting system 102 may encrypt the second data field of the second transaction data record, which has the first classification, shown as "Account Number", with the first data classification encryption key that corresponds to the first classification to provide an encrypted second data field of the second transaction data record. In some non-limiting embodiments or aspects, data owner entity system 106-2 may encrypt the first data fields and/or the second data fields of the second transaction data record with the third data classification encryption key and/or the first data classification encryption key, respectively, before transmitting the second transaction data record to data repository hosting system 102.

Figure 4D:
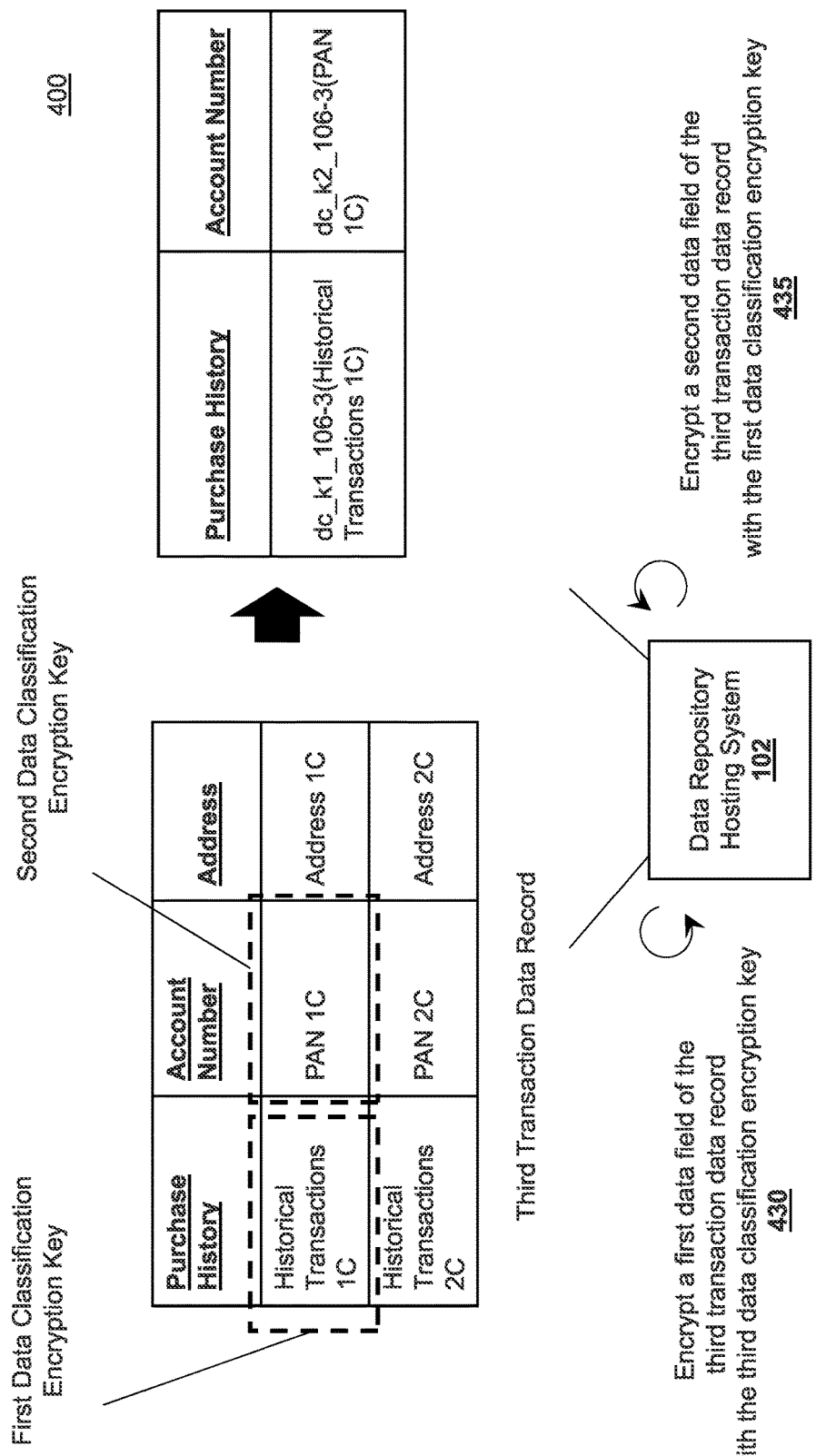

As shown by reference number 430 in FIG. 4D, data repository hosting system 102 may encrypt a first data field of the third transaction data record with the third data classification encryption key. For example, data repository hosting system 102 may encrypt the first data field of the third transaction data record, which has the third classification, shown as "Purchase History", with the third data classification encryption key that corresponds to the third classification (e.g., the purchase history encryption key) to provide an encrypted first data field of the third transaction data record. As further shown by reference number 435 in FIG. 4D, data repository hosting system 102 may encrypt a second data field of the third transaction data record with the first data classification encryption key. For example, data repository hosting system 102 may encrypt the first data field of the third transaction data record, which has the first classification, shown as "Account Number", with the first data classification encryption key that corresponds to the first classification to provide an encrypted second data field of the third transaction data record. In some non-limiting embodiments or aspects, data owner entity system 106-3 may encrypt the first data fields and/or the second data fields of the third transaction data record with the third data classification encryption key and/or the first data classification encryption key, respectively, before transmitting the third transaction data record to data repository hosting system 102.

Figure 4E:
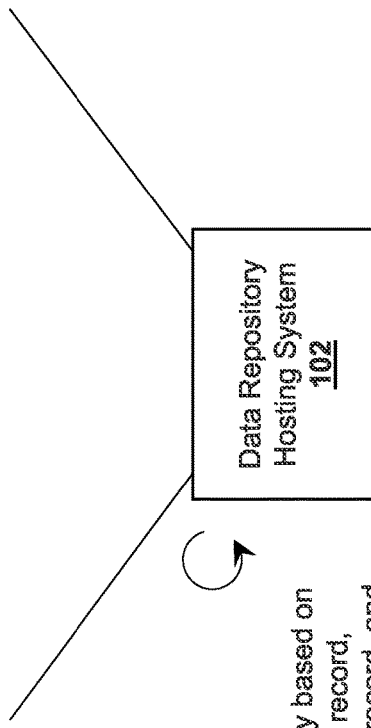

As shown by reference number 440 in FIG. 4E, data repository hosting system 102 may generate the data repository based on the first transaction data record, the second transaction data record, and the third transaction data record. For example, data repository hosting system 102 may combine the encrypted first data fields of the first transaction data record, the encrypted second data fields of the first transaction data record, the encrypted first data field of the second transaction data record, the encrypted second data field of the second transaction data record, the encrypted first data field of the third transaction data record, and the encrypted second data field of the third transaction data record to generate the data repository. In some non-limiting embodiments or aspects, data repository hosting system 102 may remove a column having data fields for data owner entity system 106-1 having the first classification based on determining the data fields having the first classification for data owner entity system 106-2 and data owner entity system 106-3 that correspond to the data fields having the first classification for data owner entity system 106-1.

Figure 4F:
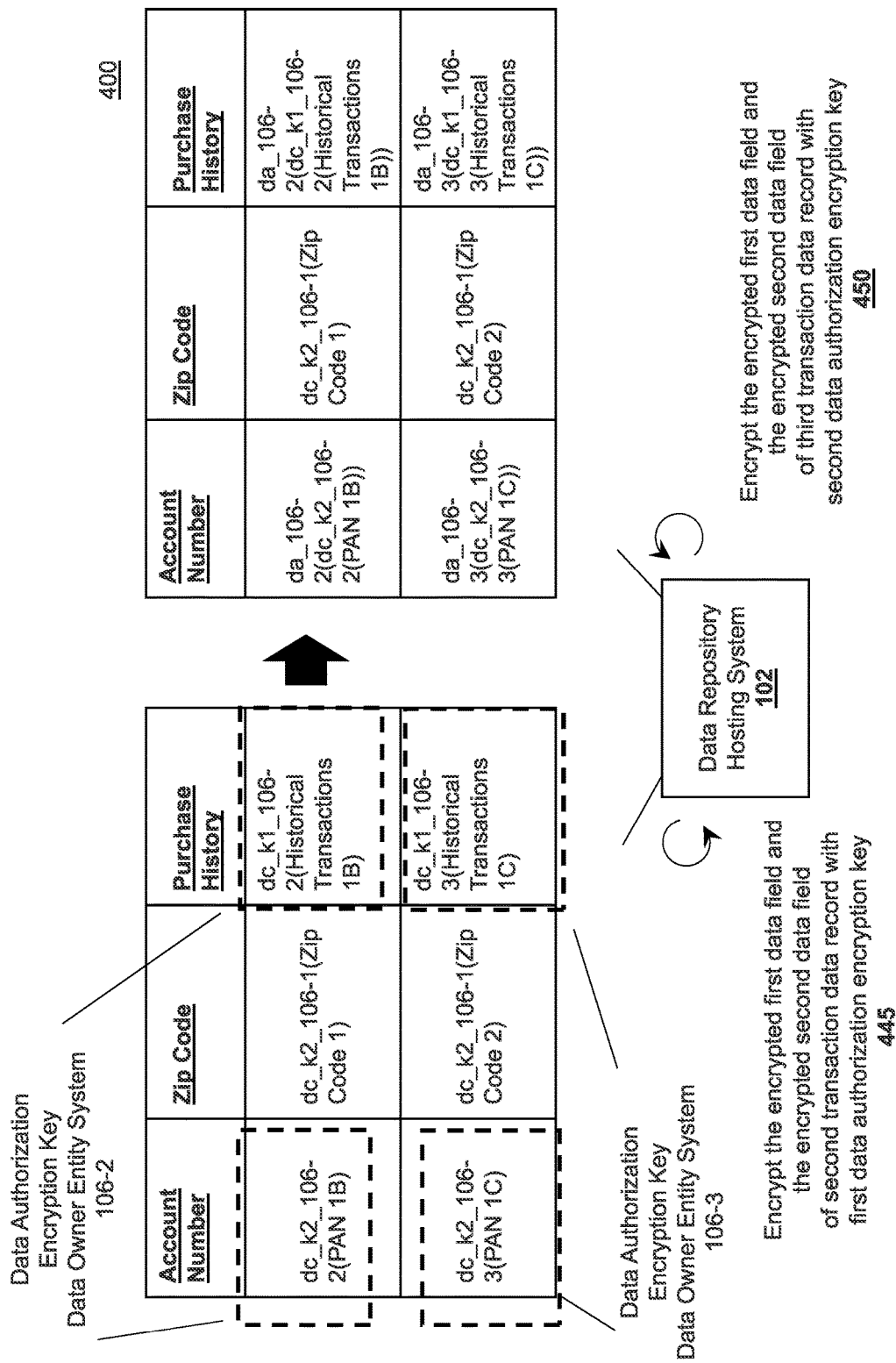

As shown by reference number 445 in FIG. 4F, data repository hosting system 102 may encrypt the encrypted first data field and the encrypted second data field of the second transaction data record associated with data owner entity system 106-2 with a first data authorization encryption key to provide a two-layer encrypted first data field and a two-layer encrypted second data field of the second transaction data record associated with data owner entity system 106-2. In some non-limiting embodiments or aspects, the first data authorization encryption key is assigned to data owner entity system 106-2. In some non-limiting embodiments or aspects, data owner entity system 106-2 may encrypt the encrypted first data field and the encrypted second data field of the second transaction data record with the first data authorization encryption key to provide the two-layer encrypted first data field and the two-layer encrypted second data field of the second transaction data record associated with data owner entity system 106-2.

As further shown by reference number 450 in FIG. 4F, data repository hosting system 102 may encrypt the encrypted first data field and the encrypted second data field of the third transaction data record associated with data owner entity system 106-3 with a second data authorization encryption key to provide a two-layer encrypted first data field and a two-layer encrypted second data field of the third transaction data record associated with data owner entity system 106-3. In some non-limiting embodiments or aspects, the second data authorization encryption key is assigned to data owner entity system 106-3. In some non-limiting embodiments or aspects, data owner entity system 106-3 may encrypt the encrypted first data field and the encrypted second data field of the third transaction data record with the second data authorization encryption key to provide the two-layer encrypted first data field and the two-layer encrypted second data field of the third transaction data record associated with data owner entity system 106-3.

In some non-limiting embodiments or aspects, data repository hosting system 102 may store the two-layer encrypted first data field and the two-layer encrypted second data field of the second transaction data record associated with data owner entity system 106-2 in the data repository. Additionally or alternatively, data repository hosting system 102 may store the two-layer encrypted first data field and the two-layer encrypted second data field of the third transaction data record associated with data owner entity system 106-3 in the data repository.

Figure 4G:
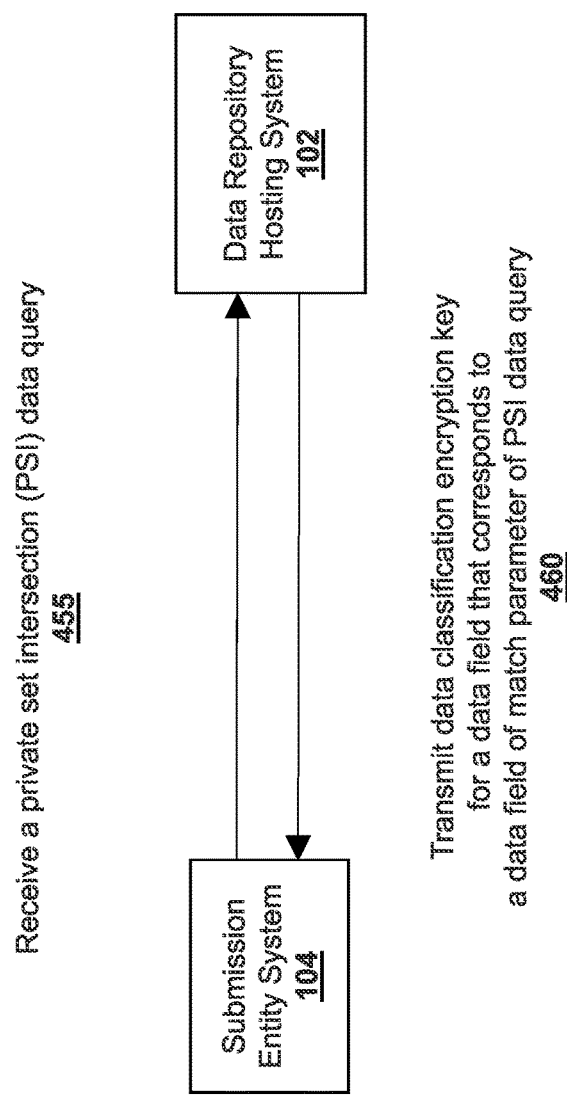

As shown by reference number 455 in FIG. 4G, data repository hosting system 102 may receive a PSI data query from submission entity system 104. In some non-limiting embodiments or aspects, the PSI data query may include a match parameter for performing a PSI data query on the data repository and an authorization parameter. In some non-limiting embodiments or aspects, the match parameter may be associated with a data field (e.g., a data field of a transaction data record). For example, the match parameter may have a classification associated with the data field. In such an example, the match parameter may be an account number for which an intersection is to be computed with the data repository. As further shown by reference number 460 in FIG. 4G, data repository hosting system 102 may transmit a data classification encryption key for a classification of a data field that corresponds to the data field associated with the match parameter (e.g., a match parameter data field of the match parameter) of the PSI data query. For example, given that the match parameter of the PSI data query is an account number, data repository hosting system 102 may transmit the second data classification encryption key for the second classification of a data field, which is an account number, since the second classification corresponds to the account number data field of the match parameter of the PSI data query.

Figure 4H:
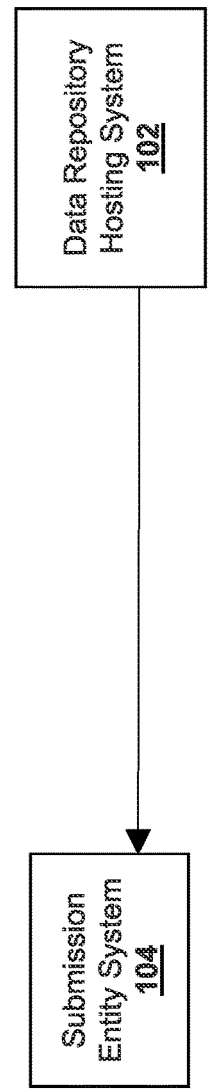

As shown by reference number 465 in FIG. 4H, data repository hosting system 102 may determine to authorize the PSI data query on the data repository. For example, data repository hosting system 102 may transmit a request for authorization based on the PSI data query to data owner entity system 106-1, data owner entity system 106-2, and/or data owner entity system 106-3. The request for authorization may include the match parameter of the PSI data query. In some non-limiting embodiments or aspects, data repository hosting system 102 may receive a response for authorization from data owner entity system 106-1, data owner entity system 106-2, and/or data owner entity system 106-3 based on the request for authorization. The response for authorization may include an indication that the PSI data query is authorized. In some non-limiting embodiments or aspects, the response for authorization may include transaction data associated with the match parameter. In some non-limiting embodiments or aspects, the response for authorization may be received by data repository hosting system 102, and data repository hosting system 102 may determine that the transaction data associated with the match parameter included in the response for authorization corresponds to the authorization parameter of the PSI data query. Data repository hosting system 102 may determine to authorize the PSI data query based on (e.g., in response to) determining that the transaction data associated with the match parameter corresponds to the authorization parameter.

As further shown by reference number 470 in FIG. 4H, data repository hosting system 102 may transmit a data authorization encryption key to submission entity system 104. For example, data repository hosting system 102 may transmit the first data authorization encryption key and/or the second data authorization encryption key to submission entity system 104 based on determining to authorize the PSI data query on the data repository.

As shown by reference number 475 in FIG. 4I, data repository hosting system 102 may perform the PSI data query on the data repository. For example, data repository hosting system 102 may perform the PSI data query by computing an intersection between the match parameter of the PSI data query from submission entity system 104 and the data repository using a PSI technique. In some non-limiting embodiments or aspects, the PSI technique may include the use of an oblivious pseudorandom function (OPRF), such as a one-time OPRF. In some non-limiting embodiments or aspects, data repository hosting system 102 may generate a PSI result for the PSI data query based on performing the PSI data query on the data repository. For example, data repository hosting system 102 may generate the PSI result based on computing the intersection between match parameter of the PSI data query from submission entity system 104 and the data repository using the PSI technique. In some non-limiting embodiments or aspects, data repository hosting system 102 may transmit the PSI result to submission entity system 104.

Although the above methods, systems, and computer program products have been described in detail for the purpose of illustration based on what is currently considered to be the most practical and preferred embodiments or aspects, it is to be understood that such detail is solely for that purpose and that the present disclosure is not limited to the described embodiments or aspects but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect.

What is claimed is:
1. A method, comprising:
  generating, with at least one processor, a data repository;

receiving, with the at least one processor, a private set intersection (PSI) data query, wherein the PSI data query comprises a match parameter for performing the PSI data query on the data repository;

transmitting, with the at least one processor, a data classification encryption key, wherein the data classification encryption key is associated with a data field that corresponds to a match parameter data field of the match parameter;

determining, with the at least one processor, whether to authorize the PSI data query on the data repository;

transmitting, with the at least one processor, a data authorization encryption key based on determining to authorize the PSI data query on the data repository; and performing, with the at least one processor, the PSI data query on the data repository.

2. The method of claim 1, further comprising:

generating a PSI result based on performing the PSI data query on the data repository;

providing the PSI result as an input to a machine learning algorithm; and generating an output of the machine learning algorithm based on the input.

3. The method of claim 1, wherein generating the data repository comprises:

encrypting a first data field of a first transaction data record associated with a first entity with a first data classification encryption key to provide an encrypted first data field of the first transaction data record associated with the first entity, wherein the first data classification encryption key is assigned according to a classification of the first data field of the first transaction data record and the first entity;

encrypting a second data field of the first transaction data record associated with the first entity with a second data classification encryption key to provide an encrypted second data field of the first transaction data record associated with the first entity, wherein the second data classification encryption key is assigned according to a classification of the second data field of the first transaction data record and the first entity;

encrypting a first data field of a second transaction data record associated with a second entity with a third data classification encryption key to provide an encrypted first data field of the second transaction data record associated with the second entity, wherein the third data classification encryption key is assigned according to a classification of the first data field of the second transaction data record and the second entity; and encrypting a second data field of the second transaction data record associated with the second entity with a fourth data classification encryption key to provide an encrypted second data field of the second transaction data record associated with the second entity, wherein the fourth data classification encryption key is assigned according to a classification of the second data field of the second transaction data record and the second entity.

4. The method of claim 3, wherein generating the data repository comprises:

encrypting the encrypted first data field of the first transaction data record associated with the first entity with a first data authorization encryption key to provide a two-layer encrypted first data field of the first transaction data record associated with the first entity, wherein the first data authorization encryption key is assigned according to the first entity;

encrypting the encrypted first data field of the second transaction data record associated with the second entity with a second data authorization encryption key to provide a two-layer encrypted first data field of the second transaction data record associated with the second entity, wherein the second data authorization encryption key is assigned according to the second entity;

storing the two-layer encrypted first data field of the first transaction data record associated with the first entity in the data repository; and storing two-layer encrypted first data field of the second transaction data record associated with the second entity in the data repository.

5. The method of claim 3, wherein generating the data repository comprises:

storing the encrypted second data field of the first transaction data record associated with the first entity in the data repository; and storing the encrypted second data field of the second transaction data record associated with the second entity in the data repository.

6. The method of claim 1, wherein the PSI data query further comprises an authorization parameter associated with the match parameter, wherein determining whether to authorize the PSI data query on the data repository comprises:

transmitting a request for authorization based on the PSI data query;

receiving a response for authorization, wherein the response for authorization comprises transaction data associated with the match parameter;

determining that the transaction data associated with the match parameter included in the response for authorization corresponds to the authorization parameter associated with the match parameter; and determining to authorize the PSI data query based on determining that the transaction data associated with the match parameter corresponds to the authorization parameter associated with the match parameter.

7. The method of claim 1, wherein receiving the PSI data query comprises:

receiving the PSI data query from a submission entity; and wherein transmitting the data authorization encryption key comprises:

transmitting the data authorization encryption key to the submission entity based on determining to authorize the PSI data query on the data repository.

8. A system, comprising:

a data repository hosting system comprising at least one processor programmed or configured to:

generate a data repository;

receive, from a submission entity system associated with a submission entity, a private set intersection (PSI) data query, wherein the PSI data query comprises a match parameter for performing the PSI data query on the data repository;

transmit, to the submission entity system, a data classification encryption key, wherein the data classification encryption key is associated with a data field that corresponds to a match parameter data field of the match parameter;

determine whether to authorize the PSI data query on the data repository;

transmit, to the submission entity system, a data authorization encryption key based on determining to authorize the PSI data query on the data repository; and perform the PSI data query on the data repository.

9. The system of claim 8, wherein the at least one processor is further programmed or configured to:
generate a PSI result based on performing the PSI data query on the data repository; and
transmit the PSI result to the submission entity system, wherein the submission entity system is programmed or configured to:
provide the PSI result as an input to a machine learning algorithm; and
generate an output of the machine learning algorithm based on the input.

10. The system of claim 8, wherein, when generating the data repository, the at least one processor is programmed or configured to:
encrypt a first data field of a first transaction data record associated with a first entity with a first data classification encryption key to provide an encrypted first data field of the first transaction data record associated with the first entity, wherein the first data classification encryption key is assigned according to a classification of the first data field of the first transaction data record and the first entity;
encrypt a second data field of the first transaction data record associated with the first entity with a second data classification encryption key to provide an encrypted second data field of the first transaction data record associated with the first entity, wherein the second data classification encryption key is assigned according to a classification of the second data field of the first transaction data record and the first entity;
encrypt a first data field of a second transaction data record associated with a second entity with a third data classification encryption key to provide an encrypted first data field of the second transaction data record associated with the second entity, wherein the third data classification encryption key is assigned according to a classification of the first data field of the second transaction data record and the second entity; and
encrypt a second data field of the second transaction data record associated with the second entity with a fourth data classification encryption key to provide an encrypted second data field of the second transaction data record associated with the second entity, wherein the fourth data classification encryption key is assigned according to a classification of the second data field of the second transaction data record and the second entity.

11. The system of claim 10, wherein, when generating the data repository, the at least one processor is programmed or configured to:
encrypt the encrypted first data field of the first transaction data record associated with the first entity with a first data authorization encryption key to provide a two-layer encrypted first data field of the first transaction data record associated with the first entity, wherein the first data authorization encryption key is assigned according to the first entity;
encrypt the encrypted first data field of the second transaction data record associated with the second entity with a second data authorization encryption key to provide a two-layer encrypted first data field of the second transaction data record associated with the second entity, wherein the second data authorization encryption key is assigned according to the second entity;
store the two-layer encrypted first data field of the first transaction data record associated with the first entity in the data repository; and
store two-layer encrypted first data field of the second transaction data record associated with the second entity in the data repository.

12. The system of claim 10, wherein, when generating the data repository, the at least one processor is programmed or configured to:
store the encrypted second data field of the first transaction data record associated with the first entity in the data repository; and
store the encrypted second data field of the second transaction data record associated with the second entity in the data repository.

13. The system of claim 8, wherein the PSI data query further comprises an authorization parameter associated with the match parameter, wherein, when determining whether to authorize the PSI data query on the data repository, the at least one processor is programmed or configured to:
transmit a request for authorization based on the PSI data query;
receive a response for authorization, wherein the response for authorization comprises transaction data associated with the match parameter;
determine that the transaction data associated with the match parameter included in the response for authorization corresponds to the authorization parameter associated with the match parameter; and
determine to authorize the PSI data query based on determining that the transaction data associated with the match parameter corresponds to the authorization parameter associated with the match parameter.

14. The system of claim 8, wherein, when transmitting the data authorization encryption key, the at least one processor is programmed or configured to:
transmit the data authorization encryption key to the submission entity system based on determining to authorize the PSI data query on the data repository.

15. A computer program product comprising at least one non-transitory computer-readable medium including one or more instructions that, when executed by at least one processor, cause the at least one processor to:
generate a data repository;
receive a private set intersection (PSI) data query, wherein the PSI data query comprises a match parameter for performing the PSI data query on the data repository;
transmit a data classification encryption key, wherein the data classification encryption key is associated with a data field that corresponds to a match parameter data field of the match parameter;
determine whether to authorize the PSI data query on the data repository;
transmit a data authorization encryption key based on determining to authorize the PSI data query on the data repository; and
perform the PSI data query on the data repository.

16. The computer program product of claim 15, wherein the one or more instructions, when executed by at least one processor, further cause the at least one processor to:
generate a PSI result based on performing the PSI data query on the data repository;

provide the PSI result as an input to a machine learning algorithm; and generate an output of the machine learning algorithm based on the input.

17. The computer program product of claim 15, wherein, the one or more instructions that cause the at least one processor to generate the data repository, cause the at least one processor to:

encrypt a first data field of a first transaction data record associated with a first entity with a first data classification encryption key to provide an encrypted first data field of the first transaction data record associated with the first entity, wherein the first data classification encryption key is assigned according to a classification of the first data field of the first transaction data record and the first entity;

encrypt a second data field of the first transaction data record associated with the first entity with a second data classification encryption key to provide an encrypted second data field of the first transaction data record associated with the first entity, wherein the second data classification encryption key is assigned according to a classification of the second data field of the first transaction data record and the first entity;

encrypt a first data field of a second transaction data record associated with a second entity with a third data classification encryption key to provide an encrypted first data field of the second transaction data record associated with the second entity, wherein the third data classification encryption key is assigned according to a classification of the first data field of the second transaction data record and the second entity; and encrypt a second data field of the second transaction data record associated with the second entity with a fourth data classification encryption key to provide an encrypted second data field of the second transaction data record associated with the second entity, wherein the fourth data classification encryption key is assigned according to a classification of the second data field of the second transaction data record and the second entity.

18. The computer program product of claim 17, wherein, the one or more instructions that cause the at least one processor to generate the data repository, cause the at least one processor to:

encrypt the encrypted first data field of the first transaction data record associated with the first entity with a first data authorization encryption key to provide a two-layer encrypted first data field of the first transaction data record associated with the first entity, wherein the first data authorization encryption key is assigned according to the first entity;

encrypt the encrypted first data field of the second transaction data record associated with the second entity with a second data authorization encryption key to provide a two-layer encrypted first data field of the second transaction data record associated with the second entity, wherein the second data authorization encryption key is assigned according to the second entity;

store the two-layer encrypted first data field of the first transaction data record associated with the first entity in the data repository; and store two-layer encrypted first data field of the second transaction data record associated with the second entity in the data repository.

19. The computer program product of claim 17, wherein, the one or more instructions that cause the at least one processor to generate the data repository, cause the at least one processor to:

store the encrypted second data field of the first transaction data record associated with the first entity in the data repository; and store the encrypted second data field of the second transaction data record associated with the second entity in the data repository.

20. The computer program product of claim 15, wherein the PSI data query further comprises an authorization parameter associated with the match parameter, wherein, the one or more instructions that cause the at least one processor to determine whether to authorize the PSI data query on the data repository, cause the at least one processor to:

transmit a request for authorization based on the PSI data query;

receive a response for authorization, wherein the response for authorization comprises transaction data associated with the match parameter;

determine that the transaction data associated with the match parameter included in the response for authorization corresponds to the authorization parameter associated with the match parameter; and determine to authorize the PSI data query based on determining that the transaction data associated with the match parameter corresponds to the authorization parameter associated with the match parameter.

* * * * *